(12) United States Patent
Forney

(10) Patent No.: US 7,613,713 B2
(45) Date of Patent: Nov. 3, 2009

(54) DATA ECOSYSTEM AWARENESS

(75) Inventor: Michael Forney, Bainbridge Island, WA (US)

(73) Assignee: Microsoft Corporation, Redmond, WA (US)

(*) Notice: Subject to any disclaimer, the term of this patent is extended or adjusted under 35 U.S.C. 154(b) by 207 days.

(21) Appl. No.: 11/291,293

(22) Filed: Dec. 1, 2005

(65) Prior Publication Data
US 2007/0130182 A1  Jun. 7, 2007

(51) Int. Cl.
G06F 3/00 (2006.01)
G06F 7/00 (2006.01)

(52) U.S. Cl. .................. 707/100; 715/745; 715/751

(58) Field of Classification Search ............. 707/104.1, 707/100, 1; 715/745, 751
See application file for complete search history.

(56) References Cited

U.S. PATENT DOCUMENTS

| | | | |
|---|---|---|---|
| 6,005,571 A * | 12/1999 | Pachauri | 707/10 |
| 6,611,839 B1 * | 8/2003 | Nwabueze | 707/101 |
| 6,834,195 B2 * | 12/2004 | Brandenberg et al. | 707/E17.109 |
| 7,117,165 B1 * | 10/2006 | Adams et al. | 705/26 |
| 2002/0053078 A1 | 5/2002 | Holtz et al. | 725/14 |
| 2004/0139001 A1 * | 7/2004 | Henriques et al. | 705/39 |

OTHER PUBLICATIONS

U.S. Appl. No. 11/291,292, filed Dec. 1, 2005.
U.S. Appl. No. 11/291,268, filed Dec. 1, 2005.

* cited by examiner

*Primary Examiner*—Vincent Boccio
(74) *Attorney, Agent, or Firm*—Westman, Champlin & Kelly, P.A.

(57) ABSTRACT

Information pertaining to human interactions with multiple data systems is collected. At least one of the human interactions occurs outside of an Internet environment. A user is provided with, based at least in part on the collected information, an indication of relevant data.

21 Claims, 14 Drawing Sheets

DATA ECOSYSTEM AWARENESS

BACKGROUND

It is common for data available to a given user of a computing device to be scattered across a broad range of different data stores associated with a variety of different data sources. Data is often distributed amongst various file folders (e.g., folders containing documents, music files, video files, graphics, etc.), system databases configured to store different kinds of data, and customized databases, such as one or more databases customized for an enterprise resource planning (ERP) application. These are just a few of an essentially unlimited list of locations where data is found. To further complicate the scene, some data will be stored locally while other data is often remotely accessible. Under the circumstances, efficiently accessing relevant data when it is needed can be a real challenge.

As the options for data storage increase, so does the potential for data islands. Generally speaking, a data island is an isolated data store, such as data that is primarily accessible through a specialized interface or application (e.g., an ERP application, a fileshare, the World Wide Web, etc.). A data island typically has little if any connection to other information stores.

Generally, but especially when there are data islands, it can be difficult for a user to navigate through different data stores to find a data item that is likely to be relevant to current needs. In many cases, the tools provided to a user to support navigation through data are somewhat primitive. It is not uncommon for a particular search to be limited to a particular data store or source. For example, a search may be limited to Internet data accessible through a web browser, to data stored in a store associated with a word processing application, or to data accessible through an email application. These are just a few examples of common limitations on searches for data.

Regardless of the scope of a given search, a user is commonly forced to sift through search results (e.g., often in a list format) on a trial and error basis in order to determine relevancy of data to current needs. The queries utilized to request the search results are not commonly configured to take contextual considerations into account, such as why the user is searching for certain information or the kind of information most likely to be useful to the user performing the query. Query results often require lots of time or experience to be effectively reviewed. Often times, query refining becomes necessary to efficiently locate relevant results. Sometimes, re-querying using different syntax or search terms is the most efficient option.

Searching multiple data stores can be a relatively tedious process. Some sources require special technical expertise for searching, such as training in an ERP solution in order to run a query against an appropriate ERP entity. In many cases, different sources will have different user interfaces and entry points, such as different web sites or different applications (e.g., word processing, spreadsheet, Internet browser, etc.).

At least because information is generally not stored in a central repository, a user is often relied upon to make good and informed decisions to get to information that satisfies current needs. This can lead to over-dependence on knowledge islands. Generally speaking, a knowledge island is a person, or a limited set of people, within an organization that are familiar with where data related to their area of expertise can be found. For example, a software company having five thousand employees may have twenty designers on staff. Two of those designers may be deeply involved in a project about which the other eighteen designers know very little. If those two designers leave the company, they very well may take with them significant amounts of their expertise in terms of where data relevant to their project can be found. It is a realistic possibility that the designers that take over the project may have to start from scratch in many regards.

One reason that it can be difficult to pick up where a knowledge island left off is that it is relatively difficult to document organization of useful information from different data sources. Often times, different sources of data will have their own organization tools (e.g., "favorites" noted in an Internet browser, special folders for containing copies or links to a user's documents, etc.). Rarely, if ever, are the various organization tools configured to link related data collections. Given the described disconnectedness, maintaining and organizing information in a useful way is difficult.

A related issue that can arise can be referred to as a process island. Take again the example of a software company having five thousand employees and twenty designers. It would not be uncommon for one of the designers or other employees to have little awareness as to what is going on in the business organization outside of his or her direct responsibilities. Unbeknownst to the designer or other employee, dozens of products could be at any of a variety of different stages in any of a variety of different processes, such as a process that begins at design conception and ends at commercial development. Barring direct person-to-person communication or correspondence specifically intended to inform, the left hand essentially does not know what the right hand is doing. It goes without saying that data most likely to be relative from the perspective of a given domain expert could very depending on where one is at in a given process (e.g., data most pertinent to conception may be very different than data most pertinent to commercial implementation).

Another related issue that can arise can be referred to as a corporate memory island. Take once again the software company example. Suppose there is an employee that is a domain expert for a specific set of customers. If this person leaves the company (e.g., resigns, dies, etc.), then the company may encounter a significant informational setback. With the employee goes the knowledge of what has or has not worked in the past, or of why one strategy may be better than another. The information is in the employee's head or, often in the best case scenario, reflected in old documents or a disorganized filing system. Even if the employee has been very helpful and tried to document everything he had been doing, there may or may not be knowledge about where key information is located and what the applicable context was. Even if the location of the documents is known, it can take a tremendous amount of time to reconstruct the business logic and get fully up to speed.

The discussion above is merely provided for general background information and is not intended for use as an aid in determining the scope of the claimed subject matter. Further, it should also be emphasized that the claimed subject matter is not limited to implementations that solve any or all of the disadvantages of any currently known systems noted in this section.

SUMMARY

Information pertaining to human interactions with multiple data systems is collected. At least one of the human interactions occurs outside of an Internet environment. A user is provided with, based at least in part on the collected information, an indication of relevant data.

This Summary is provided to introduce concepts in a simplified form that are further described below in the Detailed Description. This Summary is not intended to identify key features or essential features of the claimed subject matter, nor is it intended for use as an aid in determining the scope of the claimed subject matter.

DETAILED DESCRIPTION

Figure 1:
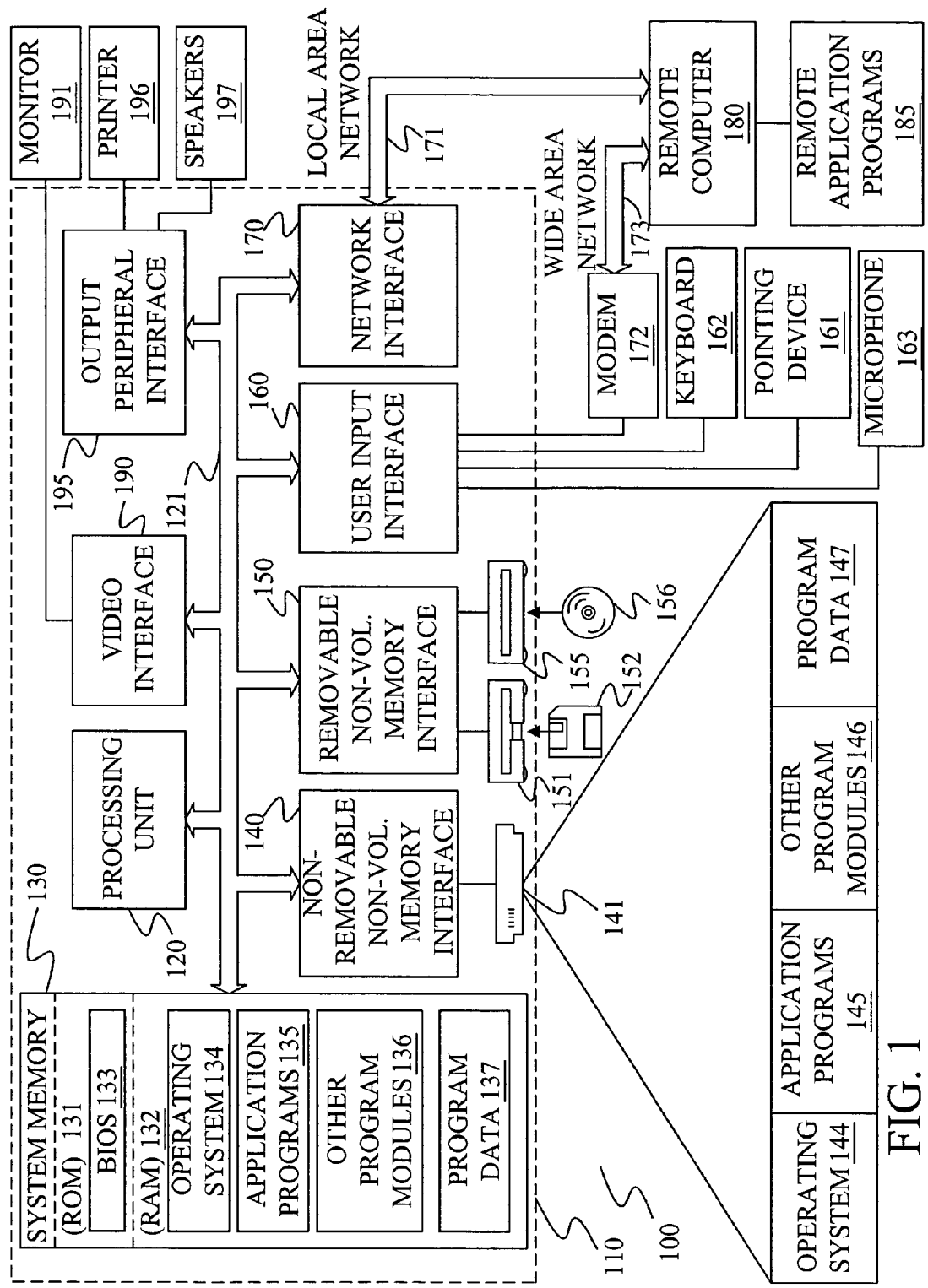
FIG. 1 is a block diagram of one computing environment in which some embodiments may be practiced.

FIG. 1 illustrates an example of a suitable computing system environment 100 in which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Generally speaking, it is desirable to efficiently provide a user with relevant data, at an appropriate time, related to their current needs. It is also desirable to provide this data without forcing the user to invest significant amounts of time processing queries with complex filters and, as is often the case, to repeat the query process within different contexts (e.g., different data sources, different data stores, etc.). In a best case scenario, a user will be provided with most if not all relevant information available to support a current task while the task is being performed, regardless of whether or not the relevant data is derived from multiple sources or data stores.

Before proceeding, it is worth mentioning that certain embodiments of the present invention will be described in the context of a system that includes an enterprise resource planning (ERP) application. Those skilled in the art will appreciate that similar concepts could just as easily be applied within an environment that does not include such an application. Some ERP applications are pre-equipped with certain specialized features such as user roles, entity information and/or process attributes. As will become apparent, these and/or other ERP features may provide some out of the box advantages in terms of the amount of work required to implement certain embodiments of the present invention. Regardless, to the extent that the present description describes embodiments in the context of an environment that includes an ERP application, it is to be understood that this is but one example of an appropriate environment.

Figure 2:
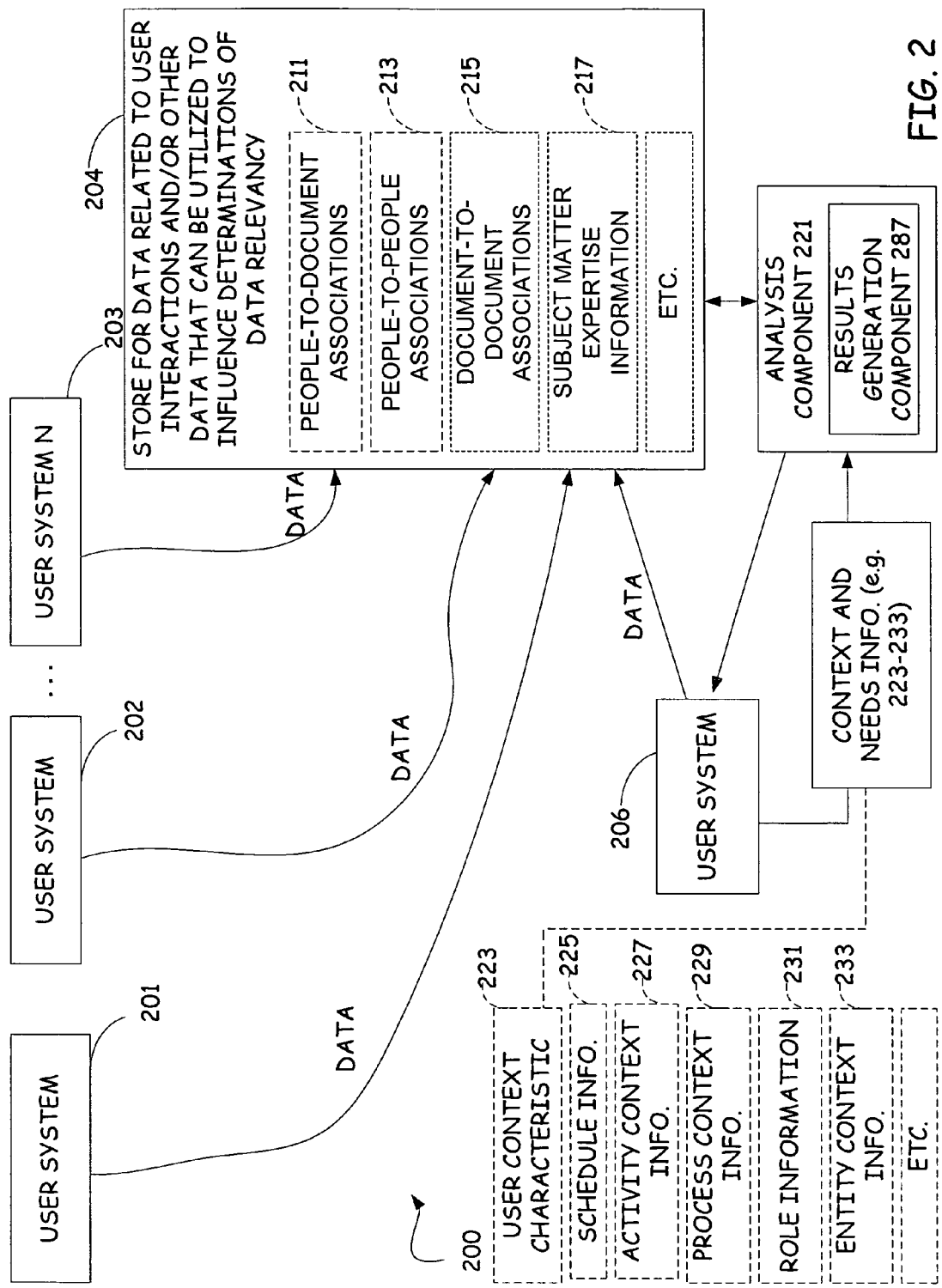
FIG. 2 is a schematic block diagram of a data management system.

FIG. 2 is a schematic block diagram of a data management system 200. Users interact with a plurality of user systems 201, 202 and 203 (only three have been illustrated in order to simplify the diagram). A user also interacts with user system 206. Data related to interactions is transferred to a data store 204. Data in store 204 is then utilized by an analysis component 221 as a basis for facilitating a determination as to which data, of all data available to the user of system 206, is most likely to be of relevance to the user's current context and needs. The relevant data, or at least an indication of it, is provided by a results generation component 287 to the user of system 206.

The analysis component 221 is configured, as necessary, to receive information about context and needs to support determinations of data relevancy from the perspective of the user of system 206. Such information may include a contextual user characteristic 223, user scheduling information 225, activity context information 227, process context information 229, user role information 231, entity context information 233, or any other information that may prove a useful ground upon which an assumption of relevance can be based. As illustrated, the information is provided directly to component 221. In actual implementation, the information may be accessibly stored in data store 204. Analysis component illustratively also has access to similar kinds of information (stored in data store 204) related to users other than the user of system 206 to which relevant content is to be delivered (e.g., related to users of systems 201, 202 and 203). This information can also be leveraged by component 221 in order to determine data relevancy.

The data determined to be most likely relevant is given priority in terms of determining what, and in what order, data is presented to the user of system 206 (e.g., presented in response to a query, presented automatically through a user interface, etc.). The actual presentation of relevant data can be manipulated to organize data based on likelihood of relevance.

As will become apparent, the data contained in store 204, upon which assumptions of relevancy are at least partially based, may extend beyond a simple record of a user interacting with data. As is indicated by boxes 211, 213, 215 and 217, the information in store 204 may include records of people-to-document associations, people-to-people associations, document-to-document associations, subject matter expertise and any other recordable system relationship that may or may not be related to interaction with a user of system 201, 202, 203 or 206. Suffice it to now say that the data in store 204 upon which relevancy assumptions can be at least partially based is both rich and diverse in nature, and is likely to include information related to user interactions with data.

In order to provide a framework for the rest of the present description, there is a little more that could now be said about the described retrieval of relevant data. Central to the proposed concept is the use of content (e.g., what the user is looking at or creating) and context (what the user is doing), as a source of a rich query, and as part of the kinds of tagging that is applied to content. The relationship of User+Context+Content illustratively feeds into queries and to an attachment of metadata to data. Examples of the nature and breadth of context and content, as they are to be applied to queries and incorporated into tagging factors, are as follows:

Context

Who—Can include details related to the user profile, the team with which the user is working, those in close organizational proximity to the user, etc. Also can include details related to those in the user's trusted network of contacts that have applicable subject matter expertise.

Where—Can include details related to specific applicable applications (e.g., business application environment, ERP, etc.). Can include details related to whether context is within a corporate or organizational network or outside of such a network. Can include details as to whether something is locally stored or published to a network. Can include details related to potential for reliability or trust based on applicable location.

Why—Can include details related to why something is being done. Is this a user task being worked on in the context of a bigger deliverable, or is it something simpler? Is this research or a specific task?

How—Can include details related to how something is being done. Is the user using a phone, a task interface (e.g., a form), an open ended interface like a word processing program? Also may include information related to applicable entry point into the system (e.g., ERP, business application environment, etc.).

Content

What Includes information related to what artifacts or objects are being worked with, what tasks are being completed, what content is being created, etc.

Ranking—Includes information related to how often data is referenced for similar tasks, whether there is reason to believe that a particular document is authoritative for the current task, or whether data is related to a subject matter expert on the subject of the applicable task, process, entity, etc.

Again, one source from which to glean this type of information is data interactions (initiated by all users in the system, including users of systems 201, 202, 203 and 206). This and other information is provided to data store 204 and is illustratively tracked at a layer above systems 201, 20, 203 and 206, supported by a separate metadata tracking system. The user-data interaction information is rich in terms of its potential for supporting later calculations of data relevancy.

It is worth pointing out that the system components that influence data selection for system 206 are generally non-expert in nature. In other words, little if anything specific needs to be known about the underlying systems from which data is derived. Thus, changes can be made (e.g., to systems 201, 202, 203 and their various sub-systems) without great concern of having a detrimental impact on the data selection benefits enjoyed by system 206.

One goal reflected in the described system architecture is to provide a user of system 206 with relatively complete and authoritative data related to their current task, regardless of where that data is stored. Harnessing and harvesting the combined expertise of a network of other users enables this to be done. In a scenario where the users of systems 201, 202, 203 and 206 belong to the same business organization, what can actually be leveraged is the combined expertise of the network effect of the entire organization, as well as their network of resources related to subjects that matter to the company. The historical experience of the workforce and information at any point of a process or task can be leveraged.

Another ambition reflected in the proposed design is to document data so as to enable some, if not total, relief to problems related to data islands, knowledge islands, process islands and/or corporate islands. Interactions and other data relationships are documented within a separate, centralized information resource (e.g., data store 204). This information illustratively pertains to data distributed across multiple data silos. An example will help to illustrate how the proposed system is intended to operate.

One can imagine a scenario wherein a patent attorney working at a law firm is about to begin drafting a new patent application related to submarine technology. That attorney may have no idea what related data resources already exist and are currently available. In order to find the resources, the attorney would traditionally have to know at least where relevant data is likely to be located, and it may not be just a single location or data source. Even if the attorney does know where relevant resources may be located, he or she will typically still be required to search for the resources, often on a trial and error basis. This can be a relatively inefficient endeavor, especially when the searching semantics utilized by the attorney are different than those selected by the individual(s) who authored or stored the data resources.

Suppose instead that the attorney is a user of system 206 in FIG. 2. The system is illustratively configured to automatically provide relevant resources to the attorney. The determination of relevancy is based on factors related to user information (information about the attorney), content and/or context as described above. For example, the context of who the attorney is and what the attorney is doing (i.e., a patent attorney drafting an application related to submarines) can be analyzed relative to other applicable information in database 204. The information returned to the attorney/user of system 206 is illustratively ranked based on likelihood of relevance.

In another example, a company employee opens a template associated with a software application running on system 206. The template is illustratively a marketing campaign template that the employee configures for a particular new product, for example, a new golf shoe. Information store 204 reflects the fact that data related to this task already exists within the resources available to company employees. For example, the information in store 204 may include an indication of the identity of a related domain expert that has spent significant amounts of time reviewing a listing of vendors responsible for related components, a listing of performance centers for such a project, etc. Based upon on who the employee is (his identity, role, etc.) and/or what he is doing (i.e., starting a new marketing campaign), the existing resources are identified and brought to his or her attention. This is just one more of many potential examples.

Thus, problems associated with data islands can be alleviated by leveraging the centralized information store 204, which extends across boundaries associated with different data sources. Further, problems associated with knowledge islands and/or corporate islands are alleviated based not on direct interaction with the relevant individuals but based on analysis of data interactions in which the individuals have participated. The history of interactions in information store 204 potentially can reveal both the identity of an expert, as well as the identity of data related to his or her expertise. Finally, problems associated with process islands are alleviated at least in that the relevancy of data in information store 204 can be filtered based on a most desirable process context. This is just one example of how a process context can be applied within the described architecture.

There is an extremely broad range of different types of data and data interactions that can be monitored and recorded for the purpose of building data store 204, and ultimately for supporting the identification of data relevant to a given user and their related context. Those skilled in the art will appreciate that the described system is especially effective when data in data store 204 reflects data types that have been mapped to and from an ERP solution. That being said, there are at least five general categories of information (money, artifacts, people, process, and history) that can be effectively leveraged under such circumstances. The five categories are described herein for the purpose of clarification and for the purpose of providing an example. It should be noted that most ERP entities tie into one or more of these concepts, thus, they are referred to subsequently in the present description as ERP data or entities.

The first category is money. Data interactions related to money can be tracked for both credits and debits. Money data can illustratively be tracked differently depending on additional data points like process, locations, or when budgetary restrictions are imposed.

The second category is artifacts. Artifacts can be any tangible object ranging from hardware assets, parts on hand required for manufacture of a product, to the product itself. Digital documents can also be considered an artifact. Less tangible artifacts that might be considered for this category are process documentation (e.g., photo or historical processes) and modeling artifacts.

The third category is people. People are a central concept to the proposed view on data. People can have roles, can be assigned tasks, can own processes, and can demonstrate or consume domain knowledge. Certain aspects of the proposed system rely on people and their input, both overtly and transparently, to map and refine results to support subsequent queries and results. People can include any person but illustratively includes people with a role, such as a role within an ERP or corporate system. Employees, vendors, and customers are examples of people that may have a role or non-role within a data ecosystem. As will be described in detail, data that these and other types of people interact with, directly or indirectly, can be tracked, displayed, and/or tagged in order to support the proposed relevant data identification processes.

The third category is process. A process is a sequence of tasks that usually ends in a transaction or results in creation of an artifact. Processes are important to track at least for evaluating success, for evaluating when or if success will happen, and for use in kicking off new processes. Time is an attribute of the process and may be used to separate discrete process elements, to provide different uses at varying stages of the process.

The fourth category is history. Historical experience of a workforce and related information can be exposed and tracked at any point of a process or task. Tracking an individual's domain knowledge will minimize the negative impact that losing that employee may have on the organization.

It is worth noting that employee knowledge will be more useful when it is tracked across structured and unstructured data sources. When experts in a given field associate (automatically and/or manually) best sources or primary sources of information on a given topic, they help preserve corporate domain knowledge in the area they are an expert. All kinds of documents are generated outside the sphere of ERP awareness that can have a dramatic impact on ERP entities (entities at the most basic level like zip-codes, or entities like a SKU or process). Thus, it is desirable that the best documents, web sites, document fragments, and processes are preserved and associated with appropriate ERP entities.

Information derived from these five categories (or other similar information) is combined with user information to enable creation of a network of connections between data and people. With more interaction and data tagging, data retrieval becomes richer and more precise. Every tag and query illustratively utilizes user information as part of the equation.

Figure 3:
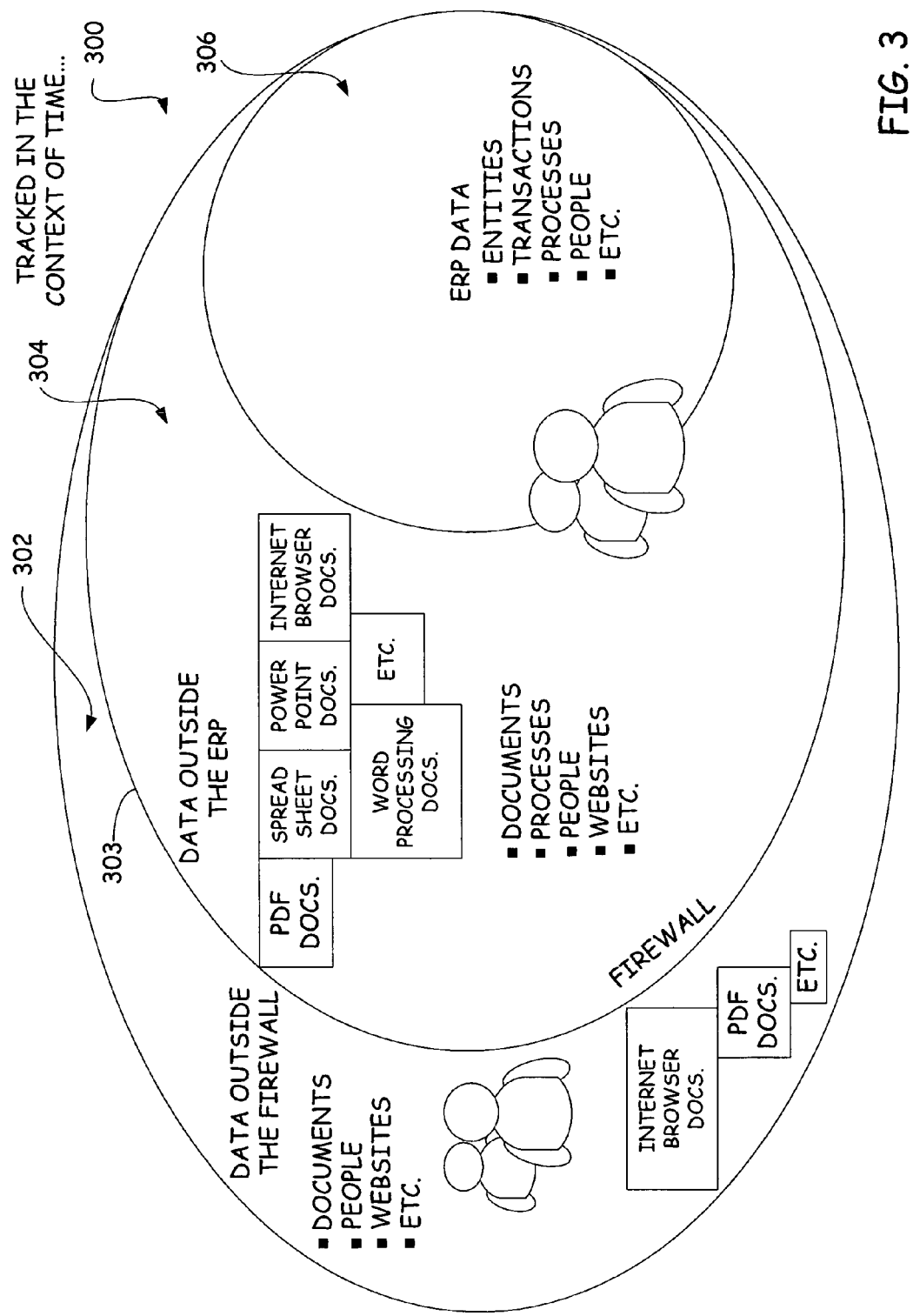
FIG. 3 is a schematic diagram of one aspect of a data ecosystem.

Valuable data, in terms of its ability to serve as a basis for generating a valid assumption of data relevancy, exists in a variety of places and formats. FIG. 3 is a schematic diagram representing one way of thinking of a data ecosystem 300. Ecosystem 300 illustratively reflects the nature of data stored in data store 204 (FIG. 2). It is important to note that the data incorporated into data store 204 typically will include data that is indicative of interactions with various specific data items but is generally separate from data sources associated with those actual data items. In other words, data ecosystem 300 is essentially configured to live on top of those data sources (e.g., the sources being, for example, a SQL database, a database for an ERP application, saved email messages, etc.).

Thus, data ecosystem 300 essentially operates over the top of underlying data sources, and can be configured to at least 1) track use and interactions in the context of associated individuals; 2) maintain user profiles; 3) maintain document profiles; and/or 4) factor in time, process context and expertise in terms useful for subsequent evaluations of relevance. The data in ecosystem 300 can be utilized as basis for determining what data is most likely to be of interest to a given user based on that given user's profile, attributes, context, etc.

The area designated as 302 represents the fact that ecosystem 300 includes information related to data outside a firewall 303. As is indicated, this can include information related to documents, web sites, and other information that might support appropriate assumptions or inferences based on relevance. People are also tracked, especially in relation to interactions with documents, web sites, etc. (e.g., who viewed the document, who viewed the web site, etc.). Time might also be taken into consideration (e.g., how long or when did he work on or view this document, how long or when did he view this web site, etc.).

The area designated as 304 represents the fact that ecosystem 300 includes information related to data inside firewall 303 but outside of an ERP system 306. As is indicated, this can include information related to documents, web sites, and other information that might support appropriate assumptions or inferences based on relevance. People are again tracked in context especially relative to data interactions. In this case, processes are also indicated as being tacked (e.g., during what point in which process was the document viewed or worked with, during what point in which process was the web site viewed, etc.). The system also might account for process documents, such as a project document, a spreadsheet document, or some other document specifically related to a process. Time can be accounted for relative to a noted process characteristic. It is again assumed that time can be accounted for in general as well.

Another category of data within ecosystem 300 is ERP data 306. The ERP data 306 includes information related to, for example, entities, transactions, processes and people. Those skilled in the art will appreciate the fact that ERP data 306 is optional in that ecosystem 300 could provide some level of functionality simply based on data within, and related to, areas 302 and 304.

That being said, there are some functional advantages that come with including ERP data. The ERP data 306 illustratively enables certain specialized relevancy assumptions to be supported. One example of this is basing assumptions on attributes of a particular ERP user role (e.g., sales roles, managerial roles, etc.). For example, the system can be configured to initially assume that a manager is a subject matter expert in terms of at least some of the data that he or she interacts with (the assumption could assumedly be overridden if based on false premises). The ERP data 306 similarly can include data that supports reasonable process-related or entity-related assumptions.

It is not uncommon for data outside of ERP data circles to be related to ERP data. This is especially true for certain kinds of business organizations affiliated with the ERP system. An example will help to illustrate this point. One can imagine a scenario involving an operations manager employed by a manufacturing company that produces golf-related products and implements a sophisticated ERP solution. Suppose the manager is working on a project involving a new golf shoe. Suppose the manager is interested in information about a particular shoe spike. Data ecosystem 300 illustratively supports a range of associations with the spike that may include ERP data but also may go beyond ERP data. Examples of associations outside of ERP data might include a list of vendors, a table of shipping costs, primary contact, notes about the primary contact, etc.

It is not uncommon for individuals within a business organization to desire interaction with an ERP system, or with ERP data, from someplace outside of the ERP system itself. The operations manager, for example, may not always be in the ERP application. Instead, he may be working with PowerPoint documents, looking at schedules, working with spreadsheets or word processing documents, or dealing with email. Thus, there can be many desirable entry points to ERP-related, as well as ERP-unrelated, data interactions. All of this is illustratively captured by data ecosystem 300.

In essence, data ecosystem 300 is a separate data cloud configured to record a collection of specialized information such as data interactions, data relationships and people relationships. This data is tracked in a separate layer above the data sources or related applications. Little if anything needs to be known about the operational characteristics or architecture of the various sources or related applications, which can generally be eliminated, or added to, or altered, with little or no consequence to the overlying data ecosystem or its related functionality.

In essence, each time a user touches data, it is as if they leave a fingerprint, which is recorded by the proposed system in a separate information-gathering data layer. By looking at when and how long the user looked at or worked with the data, and by knowing background information about the user (e.g., what her interests are, etc.), then it becomes possible to make certain quick and effective assumptions about how useful the same data will be to other people. Some of these assumptions can be based on a comparison to background information known about the other people themselves.

An example will now be provided to demonstrate how a user's interests can be determined based on assumptions derived from the tracked data. This example will also demonstrate how time can play a role within the assumption process. One can image a user that is a software designer. The tracked data illustratively reflects that this user has spent twelve working hours in the last two days working on a particular spreadsheet document. Because this is a substantial amount of time, the system is illustratively configured to assume that the characteristics of that document represent what is important to the designer right now.

To continue that example, on top of the analysis related to how long and when the document has been interacted with, one can imagine a scenario wherein data from the designer's schedule is added to the analysis. For example, the designer's schedule may show scheduled items, events, and the like, together with subject information that collectively helps to establish a personal timeline. Based on this and similar information, the system is illustratively configured to assume that, on a given few days, the designer is currently interested in a particular topic or set of topics. This information can be built into the process of locating information within the system that is most likely to be of particular interest to the designer.

The example can be extended even further. By analyzing email data within the relevant time periods, a list of other users that bear a connection to the designer's current interests can be established. Another way to do this is to examine his schedule and see with whom he is meeting. The interests of these contacts, which are likely to intersect with the interests of the designer, can be analyzed to pin down the designer's interests even further. Thus, with time, data, and data intersections, it can be established pretty clearly what the designer's current interests happen to be. Information retrieval techniques can then be biased accordingly.

It is worth mentioning that there are other ways in which a time factor can be applied as a basis for assumption. Suppose recorded information reflects that a particular document was worked with for a long time three years ago but has never been touched since. It may be assumed that the document used to be relevant but, at least for the time being, isn't currently very relevant. This assumption can be utilized as a basis for devaluing the potential relevance of the document, which will give it less weight in a query for, or retrieval of, relevant information. This is just another of many potential examples.

Thus, it should now be apparent that valuable data, in terms of the ability to serve as a valid basis for an assumption based on relevance, exists in a variety of places and formats. Valuable data may come from entities and sub-entities within an ERP environment, unstructured data in an ERP environment (e.g., requires context to provide meaning), documents outside an ERP environment, web sites, etc. As has been described, valuable data exists in people (which may be observed in the creation of and interaction with other data). In one embodiment, valuable data may include document fragments inside or outside of an ERP environment. As will now be described, one practical means for setting up a so-called "valuable assumption" is through a process of tagging data (e.g., documents, document fragments, etc.) so as to contribute useful knowledge to the body of knowledge that can be leveraged for relevancy assumptions (e.g., contributes to the data ecosystem).

Figure 4:
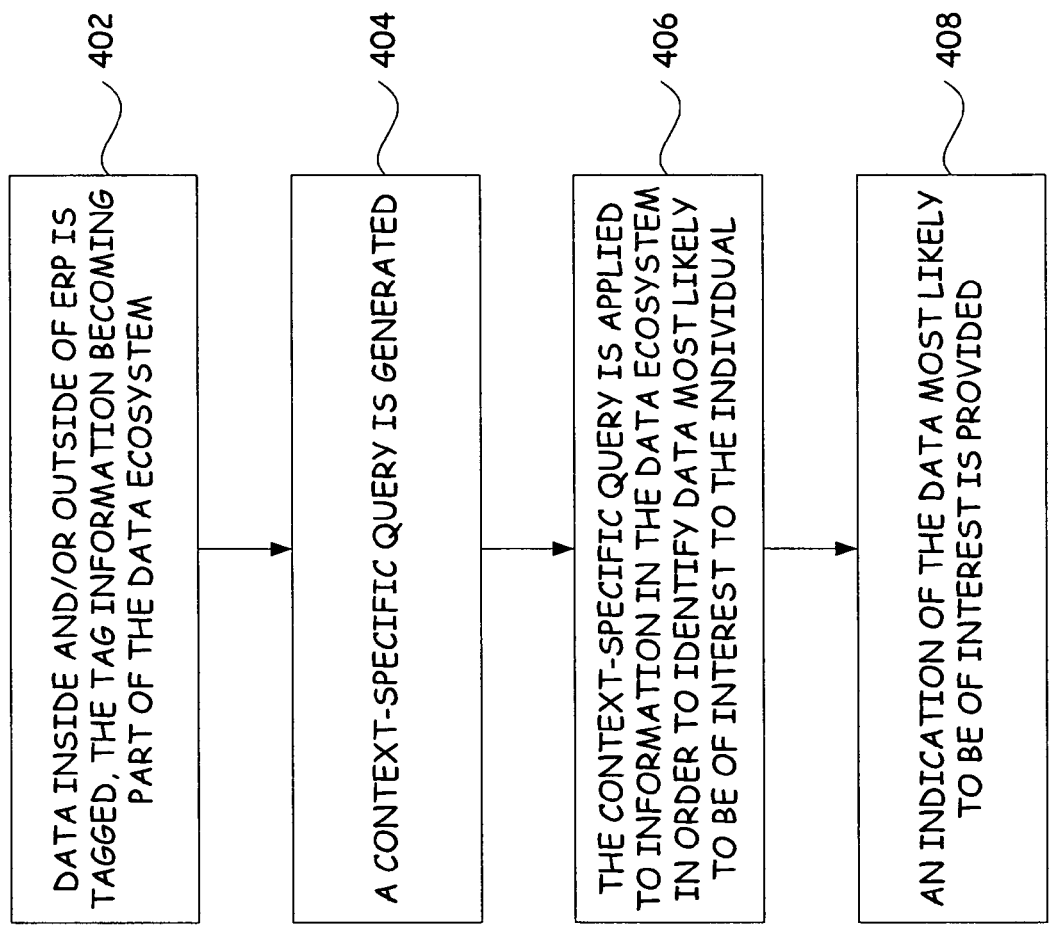
FIG. 4 is a flow chart illustrating a series of steps associated with providing an indication of relevant data.

FIG. 4 is a flow chart illustrating a series of steps associated with providing an individual with an indication of system data most likely to be of interest from the individual's contextual perspective. In accordance with block 402, data inside and/or outside of an ERP environment is tagged. The tag information could represent any kind of association such as, but not limited to, user interaction information or an association to a related document. Examples of processes for tagging will be discussed in more detail later in the present description. For now, suffice it to say that the tagging information, regardless of its precise nature, contributes to the body of knowledge that can be leveraged for relevancy assumptions (e.g., contributes to the data ecosystem).

In accordance with block 404, a context-specific query is generated. This is illustratively a query that reflects attributes of a given individual (e.g., role, circle of influence, projects, tasks, processes, expertise, interests, teams, etc.) associated with the query. It should be emphasized that at least some characteristics of the individual are configured to have an impact on the output that results from the query.

In accordance with block 406, the context-specific query is applied to information in the data ecosystem in order to support an identification of particular data that is most likely to be of interest to the individual reflected in the query. Finally, in accordance with block 408, an indication of the data most likely to be of interest is provided. In one embodiment, it is provided to the individual reflected in the query. In another embodiment, it is provided to someone else who is interested in knowing what data is likely to be of interest to the individual reflected in the query.

Figure 5:
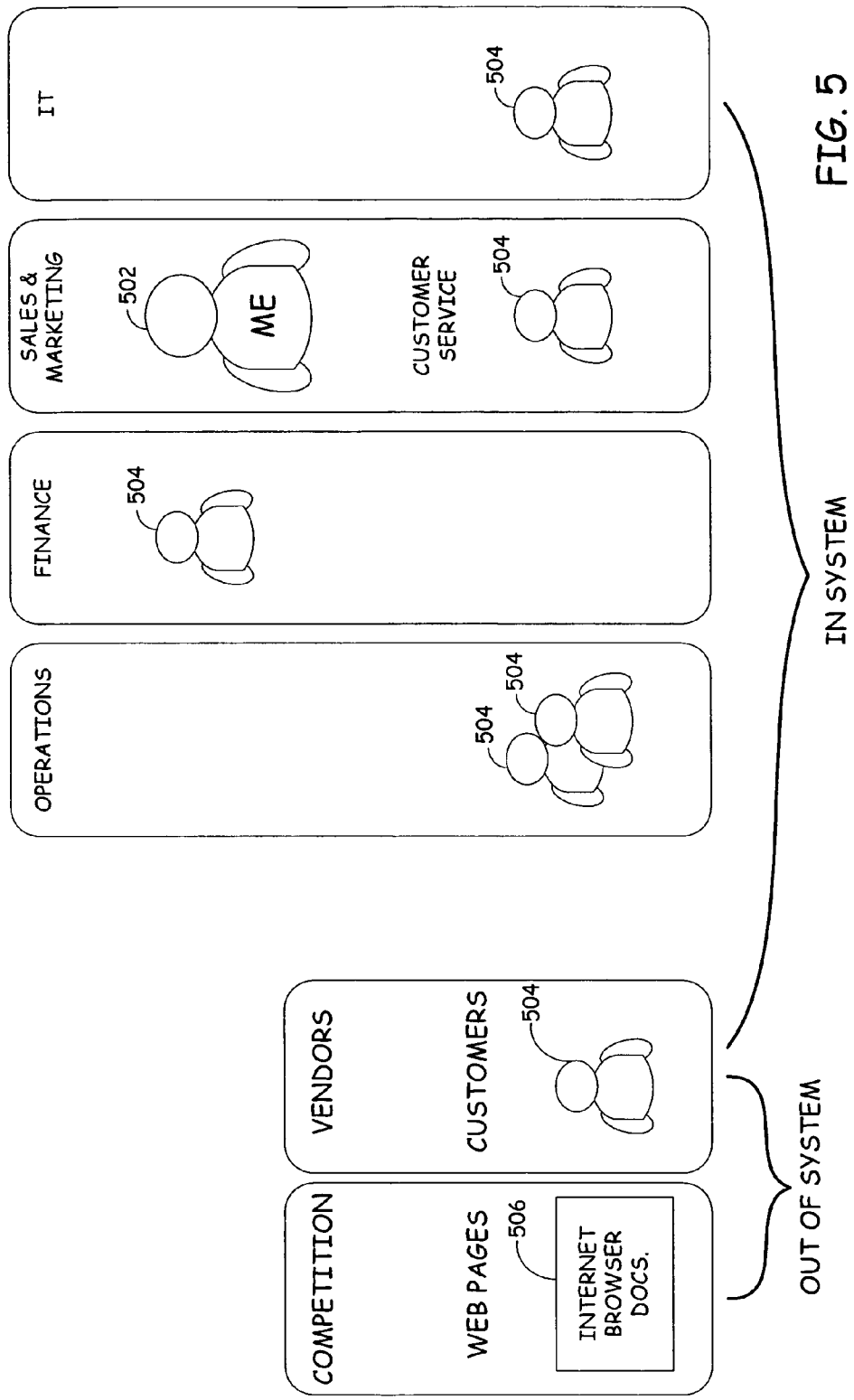
FIG. 5 is a schematic diagram illustrating how expertise is leveraged.

FIG. 5 is a schematic diagram illustrating how sources tagged or otherwise denoted as having a particular expertise are leveraged. Algorithms for querying, retrieving relevant data, ranking relevant data, etc. can be biased toward expert sources based on information reflected in tagging data. For the purpose of explaining the illustration, it is assumed that an individual 502 performs a query. Individuals 504 are illustratively applicable subject matter experts (applicable meaning they match certain context qualifications inherent to individual 502 and/or the particular query being made). Document 506 is illustratively a document having applicable content worthy of being raised as expertise (e.g., tagging indicates that an expert 504 recently reviewed the document for a significantly long period of time and emailed it to other related experts). The system algorithms can be biased as desired towards these potentially more relevant sources 504 and 506.

In order for assumptions based on the fact that an individual or data collection is worthy of being denoted with a subject matter expertise (SME) tag, label, or assumption, it is important to carefully determine when data is authoritative or from a trusted source. Otherwise, the quality of results will be compromised. One way to qualify an individual or collection of data as SME is to do so based on interaction patterns over time (e.g., interactions with certain data, data sources, or other individuals that are already SME's on a given subject, etc.). The following factors are examples of other factors that can be given weight in the determination:

Data generated or associated with specific departments and roles may be at least initially viewed as authoritative.

Data with higher frequencies of interaction, or more recent interaction, can be factored more heavily into the analysis (SME can illustratively expire after a long period of no interaction).

People who create data in the scope of their role or department may be viewed as having SME.

People who create data that receives high frequency of interaction may be viewed as having SME on a given subject (regardless of their organizational placement.

Figure 6:
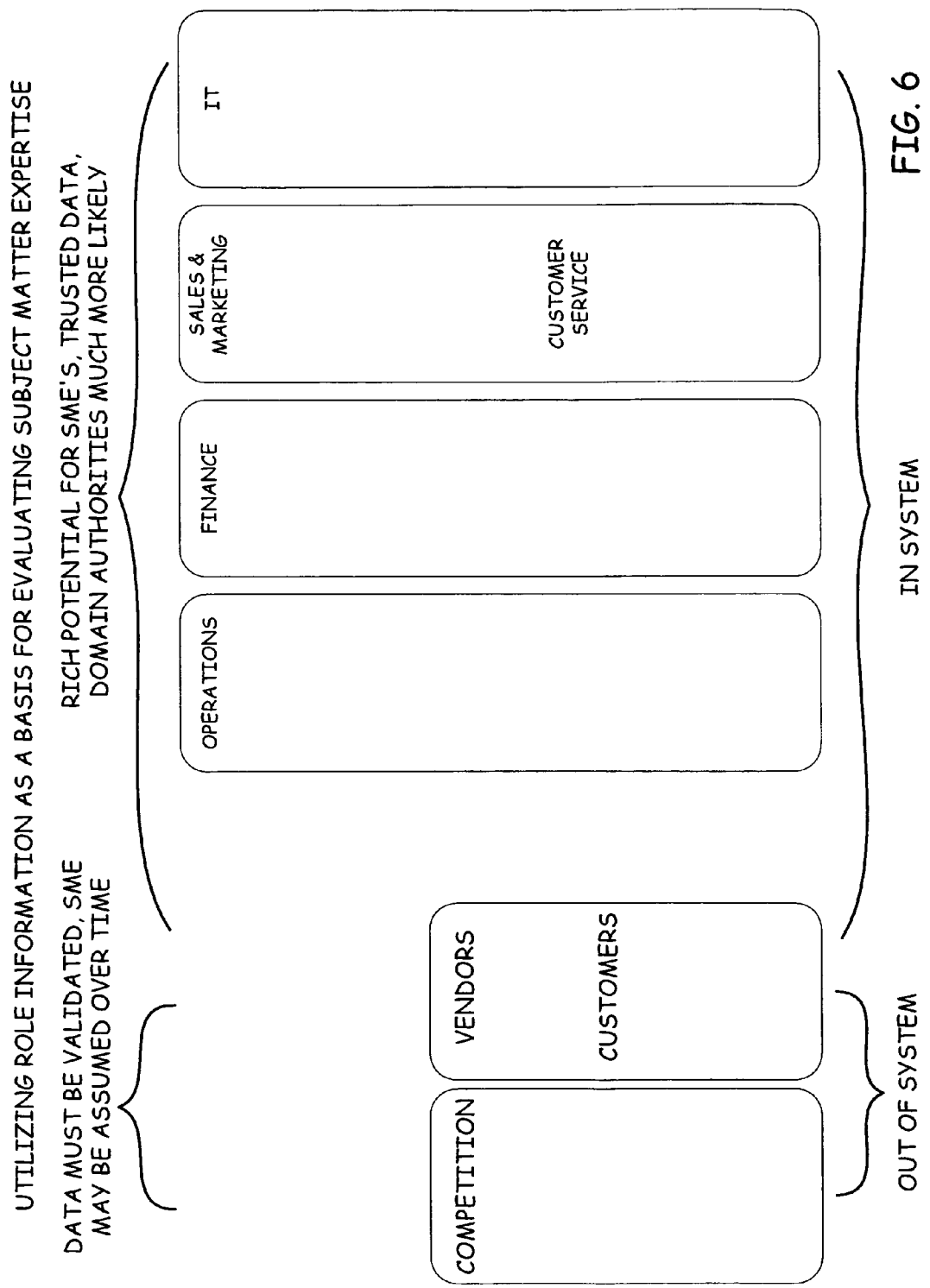
FIG. 6 is a schematic diagram demonstrating how expertise can be weighted based on varying levels of trust.

FIG. 6 is a schematic diagram demonstrating how a decision whether to consider a source as having subject matter expertise can be weighted based on varying levels of trust. The levels of trust are based on a role within, or relationship to, an organization. Generally speaking, there is a bias for roles that operate from within the company (although, as indicated, some vendors and customers could have a trusted relationship). The competition, as well as some vendors and customers, is generally less trusted at least in terms of potential for subject matter expertise.

Figure 7:
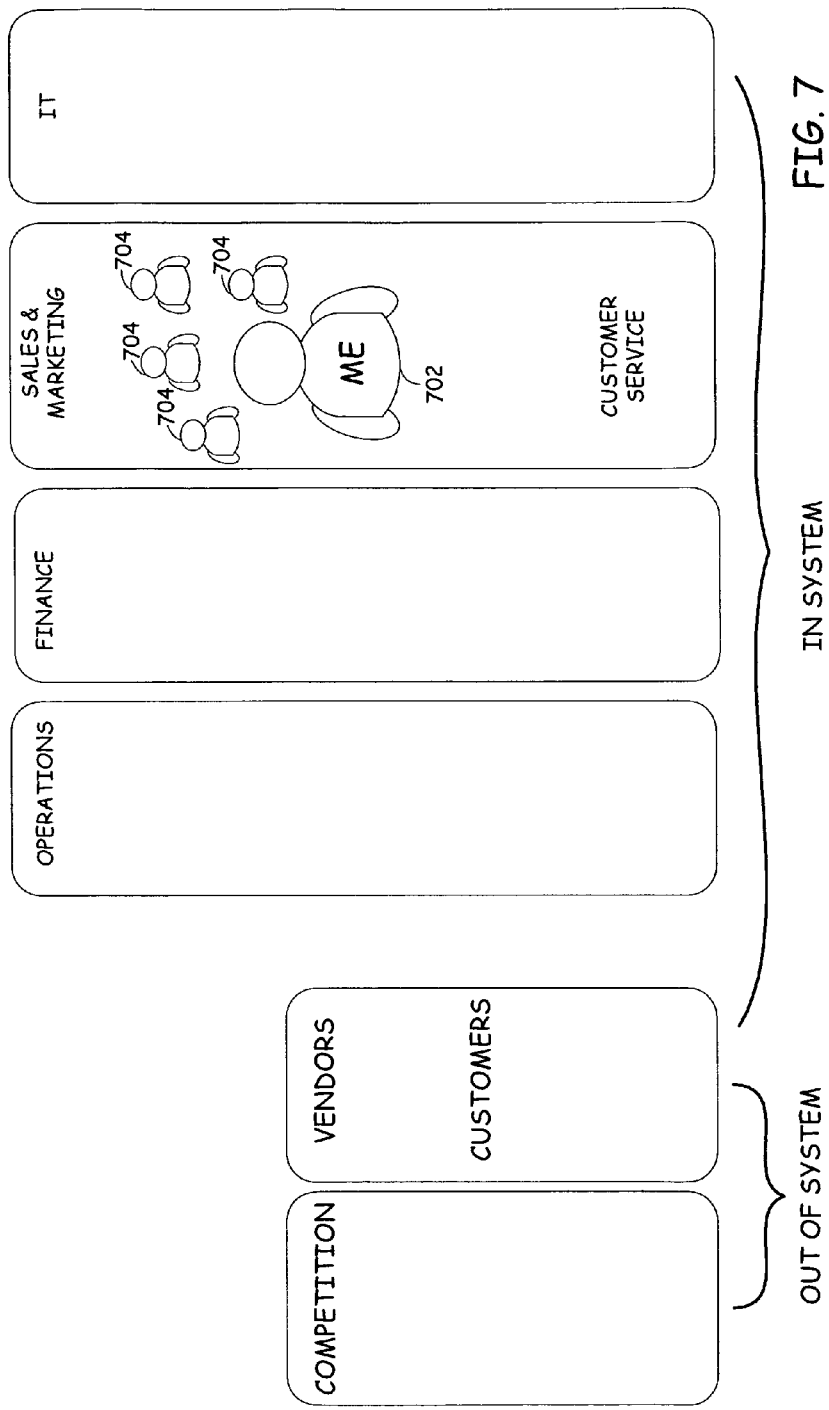
FIG. 7 is a schematic diagram illustrating how role and organizational proximity can be utilized as a basis for leveraging an outcome.

FIG. 7 is a schematic diagram illustrating how role and organizational proximity can be utilized (e.g., through tagging data contributing to the data ecosystem) as a basis for leveraging an outcome. Algorithms for querying, retrieving relevant data, ranking relevant data, etc. can be biased toward closer role and organizational proximity. For the purpose of illustration, it is assumed that an individual denoted 702 performs a query. Individuals 704 illustratively have closely related roles and/or are in close organizational proximity to individual 702. The system algorithms can be biased as desired towards these potentially more relevant sources. The same could be true for data (documents, etc.) demonstrating a similar organizational connection.

Figure 8:
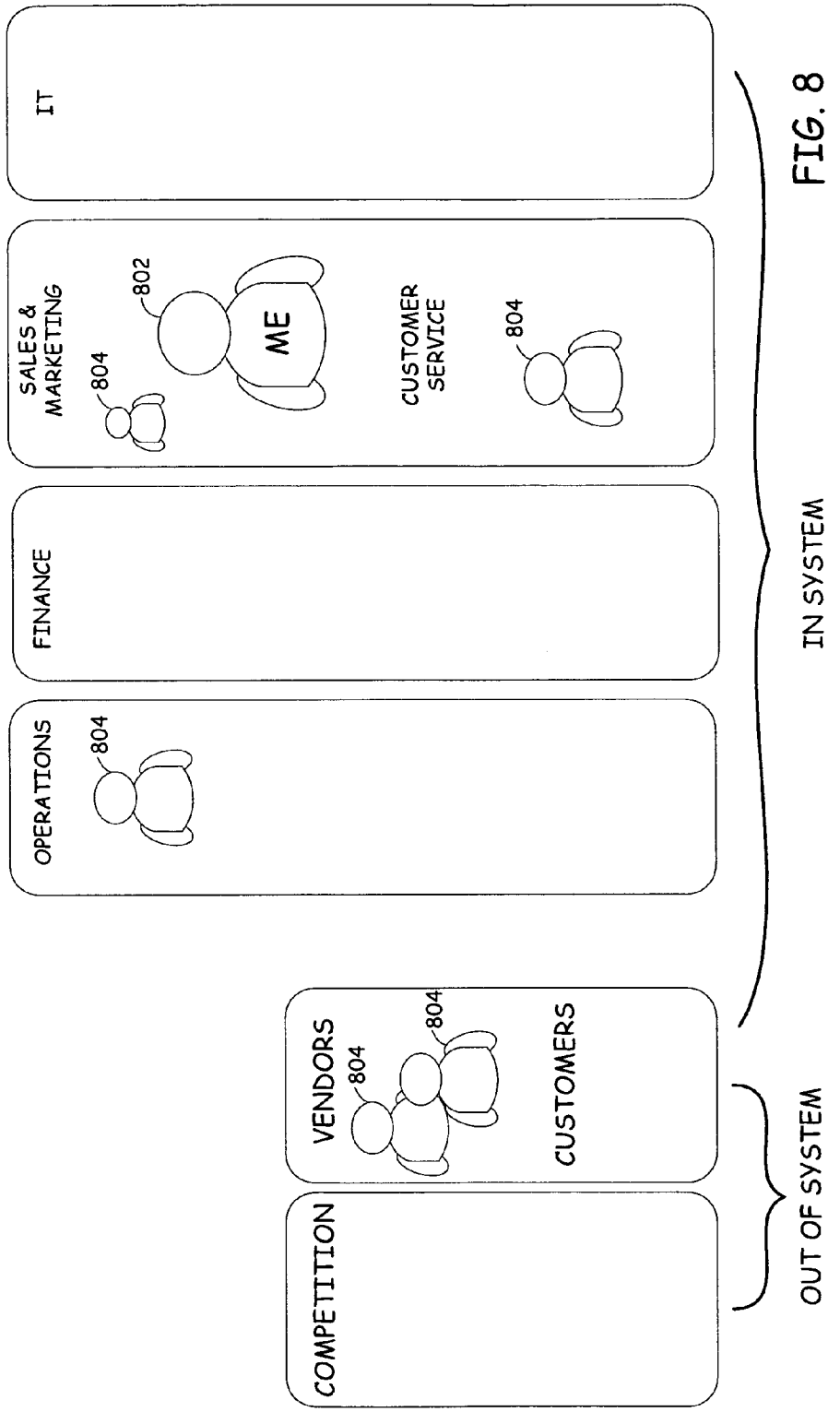
FIG. 8 is a schematic diagram illustrating how team proximity can be utilized as a basis for leveraging an outcome.

FIG. 8 is a schematic diagram illustrating how team proximity (e.g., people you are currently working with) can be utilized as a basis for leveraging an outcome. Algorithms for querying, retrieving relevant data, ranking relevant data, etc. can be biased toward closer team proximity. For the purpose of illustration, it is assumed that an individual 802 performs a query. Individuals 804 illustratively have a closely related team relationship (e.g., they are currently working with individual 802 on a project). Thus, the algorithms for data retrieval can be biased towards these potentially more relevant sources. The same thing can be done for data (documents, etc.) demonstrating a similar team connection.

Thus, the proposed system is built around the concept of so-called "Me-centric" queries and/or tagging. Another way of looking at it is as an awareness of individual users within the queries and within the data ecosystem. This enables evaluations of data relevancy that are relatively user and relationship specific.

It is typical for ERP solutions to have some level of awareness of an individual's personal attributes, such as an awareness of roles, tasks (task awareness, which can be tied to an individual user, enables a showing or tagging of the right data at the right time), and in many cases, which data was created by which individual. However, most of this information is not shared across the data ecosystem. Allowing data stored outside the ERP system to be tagged with Me-centric metadata is one aspect of tying diverse data stores together.

When an individual interacts with a document or entity, they are, in essence, automatically contributing to ranking the data based on relevance. Every time a file is opened, every time a discussion takes place in email, every time an entity is acted on, every time the web gets surfed, information relationships get refined, enriched and updated. Of course, other interactions will lead to similar results.

Those skilled in the art will appreciate that queries can be loaded, and data can be tagged, with a very broad range of information. The exact nature of query and tagging components will depend upon how relevancy is to be evaluated within a particular system. Examples of role and task awareness information appropriate for supporting data tagging and information retrieval include data in the following broad categories:

My Department
Who do I report to? Who reports to me? Are there departmental goals, budgets and/or processes?

My Team and Organization
Who am I working with?—Who consumes my information?—What is the team working on in relation to my work?—What are the higher goals and how to my contributions map to those goals?

My Tasks (and Projects . . . and Processes)
Small tasks and big tasks alike—task awareness for individuals provides needed context for data tagging and retrieval—ERP systems and profiles may incorporate a broad notion of tasks and process My Areas of Subject Matter Expertise
Even outside my responsibilities—capture SME wherever it lives in the corporate environment to build corporate domain expertise and expose good data from experts on the data My Security Permissions
Knowledge of what can be shown and where I can navigate—Which data exposes information into the data ecosystem is illustratively configurable My Data Interactions
ERP applications and documents, local and server stored documents, web pages, and process interaction Time
Length of time document viewed or worked with, when things were accessed, etc.

Other Examples
My interests, my circle of influence, my friends, my contacts, people I'm currently working with, my schedule, etc.

An individual's query and tagging profile is, of course, somewhat dynamic. For example, it will change as the individual's role changes. In this case, it may be important for knowledge of the individual in the old role to still be tracked to provide historical value for people who were formerly role peers. Without this persistence of historical profiles, companies would lose former contributions, which may have contributed to the role change in the first place.

For example, consider a scenario where a customer service representative has received a promotion. In the old role, the employee's tagging and data retrieval profile focused on contacts, SKU's, and call escalation and routing to technical support staff. In a new role as a customer service manager, the employee will illustratively be responsible for human resource issues with her staff, establishing and updating customer service processes, and tracking service responses for her team. The previous work as a customer service representative is still valid and important, but some aspects are not relevant to the new position and responsibilities. To maintain data awareness of both old and new contributions, the employee's active data profile is illustratively a new and unique value that can be tracked independently from her previous profile. This maintains her contribution in her old role so others may benefit from her interaction with the system, but changes how she contributes to and consumes data in her new role.

One of the benefits of the proposed system is an ability to leverage relevancy assumptions based on links, for example, links between people and data (e.g., people-to-document links), links between data (e.g., document-to-document links), links between people (e.g., people-to-people). There are a variety of ways to implement the tracking of such links. Tagging, which is essentially creating associations through metadata reflected in the data ecosystem, is one way to get it done.

The process of tagging (e.g., tagging across data sources) can be accomplished in a variety of different ways. One strategy is overt or "manual" tagging. Another strategy is transparent or "dynamic" tagging. Using both of these strategies in conjunction with one another enables a user either to control specific tagging relationships or to ignore the tagging process and perform their work as they usually do but still contribute to and enrich the data ecosystem.

Those skilled in the art will appreciate that there are many ways for transparent tagging to be implemented. One way is to tag based on context awareness. For example, in some cases, opening certain documents or ERP queries in context with another document or query will create tagging information that encompasses the contextual association. This may occur, for example when opening a word processing document containing product information in context with a product query. This is but one example of tagging based on context awareness.

Another way to carry out transparent tagging is to tag based on frequency of use, which can be utilized as a basis for implying relevance. Similarly, tagging can reflect frequency of forwarding, copying, or linking—data movement in more general terms. Transparent tagging can also be based on a textual or implied reference. For example, mentioning a SKU name (or product features that imply the product) in a word processing document could automatically create tagging information. Dwell time is another possibility. For example, information can be tagged to reflect how long an individual (or their team, etc.) has spent with a particular document open. Some transparent tagging may be more mildly overt, for example, tagging a document placed into a directory to be consistent with a pattern of tagging reflected by the vast majority of the other documents already in that directory. These are just a few examples of many different ways to support transparent tagging.

Similarly, there are many ways for manual tagging to be carried out. It should be emphasized that manual tagging is generally much more than entering keywords or manipulating XML. Instead, manual tagging is generally when a user, by virtue of tools or directories, takes action to associate on kind of data with another. In some advanced scenarios, users may choose to update or manipulate keywords. However, manual tagging can be a much more obvious form of associating data from one system to another.

One specific way to tag manually is to create associations with an entity within an ERP environment (e.g., product photos of a golf shoe are manually associated with the appropriate product ID). Another way is to create associations with a process—linking documents or document fragments, entities, and/or ERP queries with a process (e.g., copying or highlighting text, images or data from the ERP like sales totals and adding them to a project like a sales campaign). Still another way to carry out manual tagging is through an attachment scheme where an attachment gets associated with the parent document metadata. Another way is to support adding links, where links essentially behave like an attachment.

Figure 9:
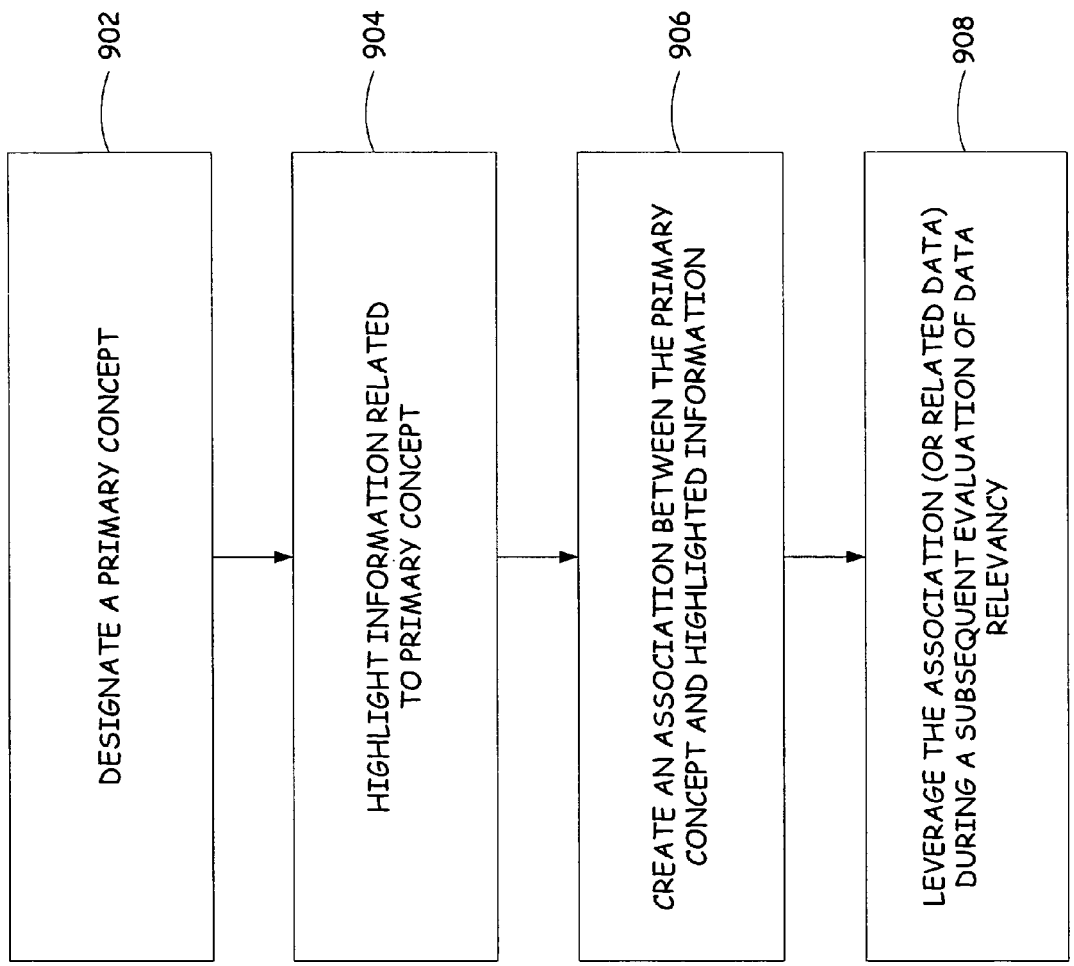
FIG. 9 is a flow chart illustrating steps associated with functionality of an entity highlighter.

Another way for a user to cause a metadata association to happen is through a tool herein referred to as an entity highlighter. FIG. 9 is a flow chart illustrating steps associated with the functionality of an entity highlighter. In accordance with block 902, this tool enables a user to designate a primary concept. In accordance with one embodiment, the primary concept is selected from a set of candidate concepts. For example, a user can scroll through candidate concepts, or select a candidate concept by key word searching, or otherwise accomplish selection. In some instances, perhaps where there are candidate concepts that are relatively similar, it may be preferable to select a group of primary concepts in place of just one.

Once a primary concept(s) has been selected, in accordance with block 904, the user can highlight (e.g., through traditional computer-implemented selection means) information (key words, key phrases, key paragraphs, etc.) that is related to the primary concept. In accordance with block 906, an association is created (e.g., via tagging) between the primary concept and highlighted information.

Finally, in accordance with block 908, data pertaining to the association is leveraged in order to influence a subsequent evaluation of data relevancy. The connection between the documents is illustratively just one factor that is recorded (e.g., recorded and added to the data ecosystem). For example, information as to when the association was created, as well as by whom, can also be monitored. All data that is recorded with regard to the association has the potential to be utilized as a basis for influencing relevancy.

It should be noted that the entity highlighter can be implemented regardless of the existence or non-existence of an ERP system. With an ERP system, a user can go through the ERP system and use an ERP entity as a primary source. For example, the user can first search and identify any entity or set of sub-entities, and then start highlighting retrieved information to create associations to that entity information. Thus, associations are created with information within the ERP system. By doing it this way, when a user subsequently encounters a related word processing document (or a spreadsheet document, etc.) related to the primary source entity, the user will be able to track the connection to the associated data. The entity highlighter essentially allows a user to hard code an association that enables him or her to extract ERP data from a non-ERP source.

It is worth noting that different users might make different associations. For example, one user might connect a product to a west coast entity, while another user connects the same product to an east coast entity. The difference between the users may be a matter of perspective and relative expertise. Both associations may prove valuable depending upon the context within which the information is later surfaced.

Without an ERP system, the entity highlighter can be implemented from a user context. In other words, the primary concept can be selected, for example, from a set of user attributes. A user may choose a work attribute in order to associate work-related data, but the same user may choose a attribute outside of their scope of work (e.g., a vintage motorcycles attribute selected by a mailroom employee) in order to associate data outside the scope of employment.

In one embodiment, attributes from which a user can select include attributes associated not with the user but with people to whom the user has a close connection. For example, candidate attributes may surface through exploration of connections to other closely related people (e.g., if all of the users with which communication is most frequent have a particular attribute, it may be safe to assume a connection to that same attribute). Those skilled in the art will appreciate that the alternatives for attributes are too numerous to be completely described in the present description.

Once an attribute has been selected, then, utilizing the entity highlighter functionality, the user can map to related targets (e.g., documents, fragments, web pages, ERP data, etc.) in order to create appropriate associations. It should be noted that another alternative is to provide candidate concepts based on a corporate taxonomy or some other basis.

Thus, in an ERP system, the highlighter process can start with an ERP entity because it is beneficial to map everything back to the ERP system (this enables more entry points into the ERP system and supports more complete and accurate ERP reporting functionality). If there is no ERP system, then instead of setting the primary concept as ERP information, user information, corporate taxonomy information, or some other information can be utilized as a set of concepts from which to choose. It should be noted that the entity highlighter functionality can be made available through a variety of different entry points both inside and outside an ERP system (e.g., entry through word processing app, spreadsheet app, Internet browser, operating system, etc.).

In another example, one can imagine a scenario where a new document comes in (or is created) and has never been tagged. It may not be immediately apparent that the document is closely tied to anything (e.g., closely tied to a product that is currently being worked on). The user can review the document and select one or more primary concepts from an entity highlighter interface (e.g., the concepts might include men's golf shoe, ProStar Golf Shoe, etc.). The primary concepts could be, but are not necessarily, selected from a static set (e.g., ERP entities, user terms, corporate taxonomy information etc.). Then, the user can start highlighting information directly related to the selected primary concepts. As this is done associations are made. The process can be repeated for other primary concepts, even for the same document. Different users can repeat the same process. The associations that are made, together with the context in which they are made (e.g., the time and identity of the user) add to the data ecosystem and further enhance its capability to serve as a basis for relevance assumptions.

The data ecosystem essentially creates a storehouse for expertise that does not go away when people go away. The system takes advantage of people interacting with the system and interacting with each other. The system is non-expert in that the underlying systems associated with data sources can change with little or no consequence. A final issue then is how the context-sensitive relevant information is delivered to end-users.

Figure 10:
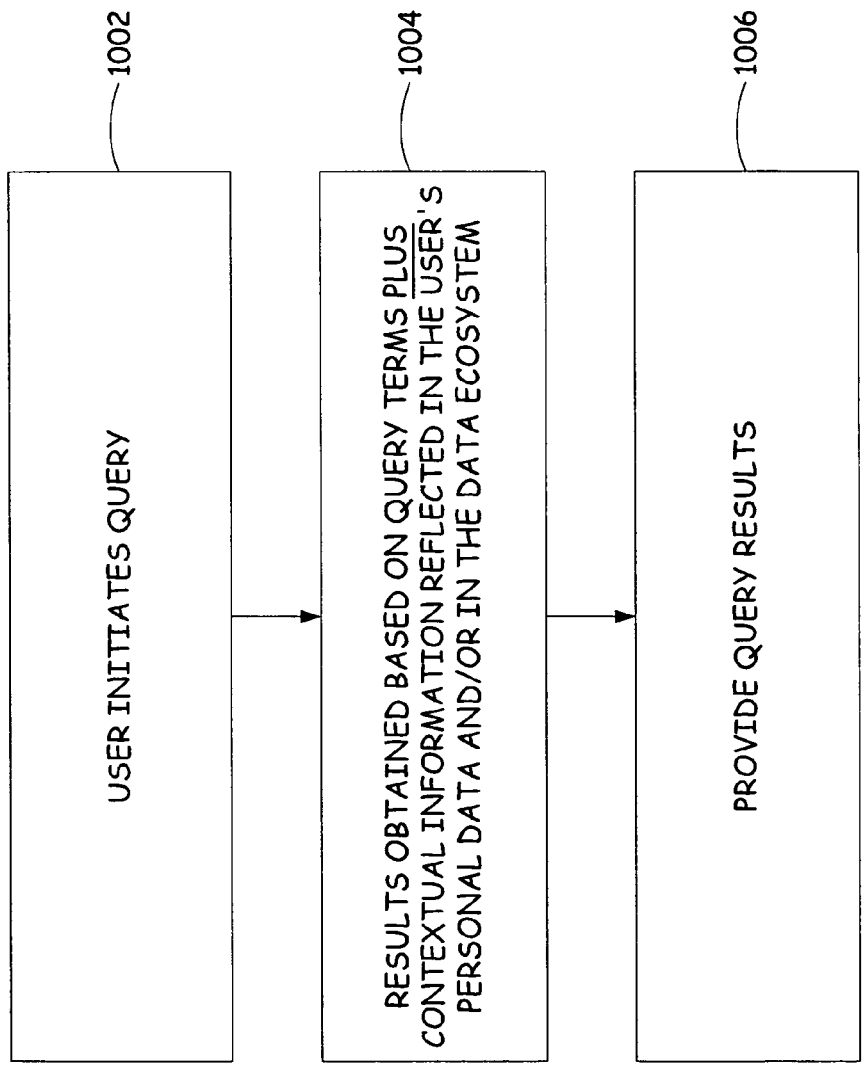
FIG. 10 is a flow chart illustrating steps associated with querying.

FIG. 10 is a flow chart demonstrating that one way to deliver the benefits of the data ecosystem is through querying. For example, a query can be initiated for information that matches certain key terms (step 1002). However, in order to influence the relevance of query results, the query can be biased (step 1004) past the query terms in order to account for the context of the user that initiated the query, an entity context (ERP or any object), an activity context, the context of other users (team members related to the user, people in close organizational proximity), subject matter expertise and/or a process context. The order in which results are returned may also be influenced (step 1006).

A traditional query process with the user submitting query syntax and reviewing the query results is, however, not a necessity.

Figure 11:
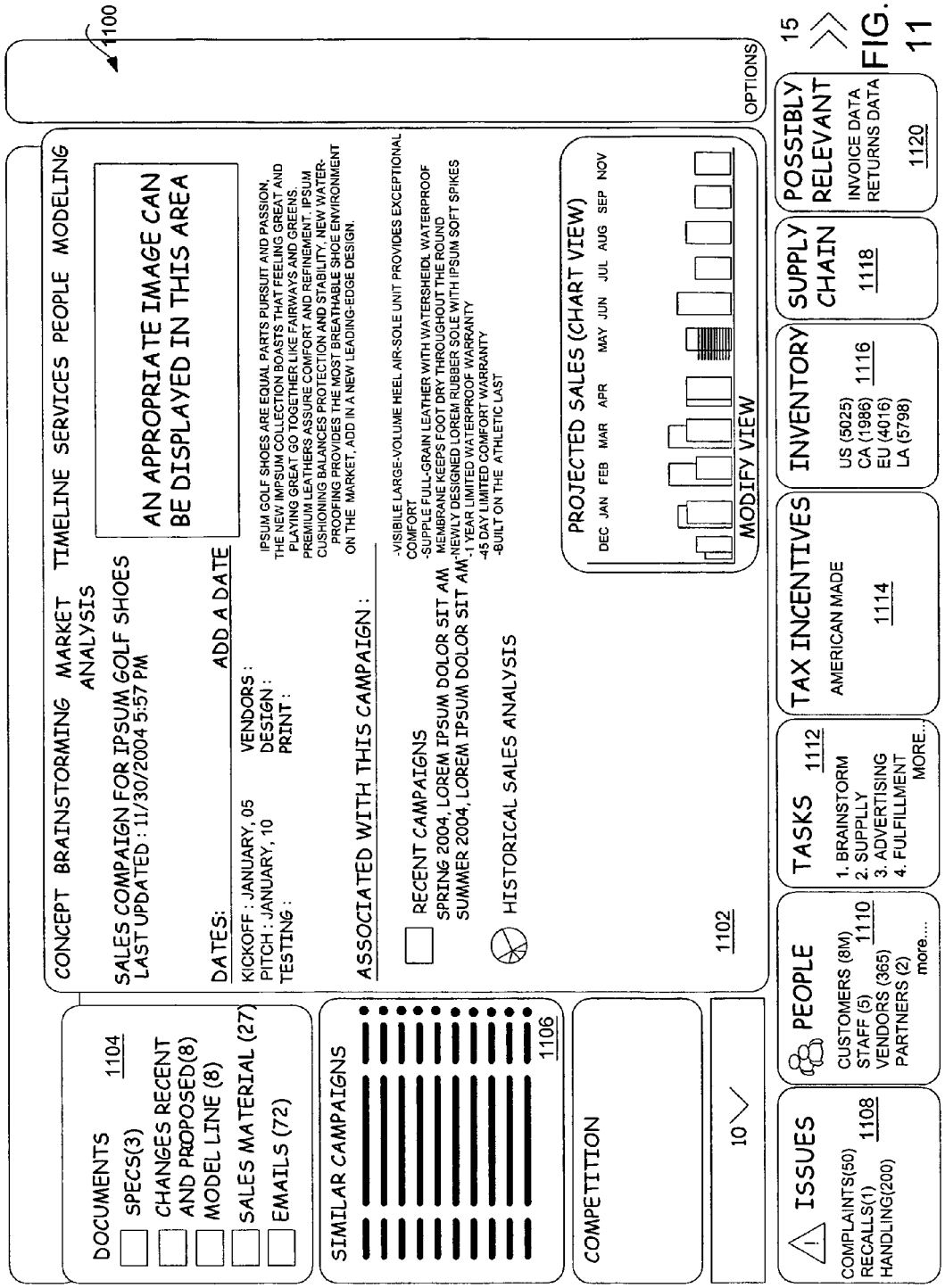
FIG. 11 is an illustration of a dynamic user interface.

FIG. 11 is an illustration of a dynamic user interface 1100. In the approximate upper center of interface 1100 is an active document 1102. The user is able to type, add graphics, edit and otherwise manipulate document 1102. Document 1102 is illustratively being created by a user as part of a sales campaign for "Ipsum Golf Shoes." It should be noted that in actual implementation, document 1102 could be a word processing document, a spreadsheet document, a PowerPoint document, or any other kind of document or configurable data file. Alternatively, document 1102 can be implemented as part of an overall custom user interface.

Around the outside of document 1102 is a plurality of data displays 1104-1120. At least some of the subject matter categories associated with these displays are illustratively selected based on contextual relevancy. Further, the content of at least some of the displays is automatically selected, potentially from different data sources, based on contextual relevancy (e.g., content is fed by queries against the data ecosystem specifically intended to surface contextually relevant data from a variety of data sources). Still further, for at least some of the displays, the order in which content appears is influenced based on contextual relevancy.

The document display 1104 contains a listing of relevant documents. Display 1106 contains a listing of similar sales campaign documents. Display 1108 contains a listing of relevant issues. Display 1110 contains a listing of relevant people. Display 1112 contains a listing of relevant tasks. Display 1114 contains a listing of relevant tax information. Display 1116 contains relevant inventory information. Display 1118 contains relevant supply information. Display 1120 contains a listing of other possibly relevant information.

The queries utilized to surface contextually relevant data for displays 1104-1120 are illustratively configured to take into account any or all of a variety of different contextual considerations that are either directly related to the current user or that are directly reflected in the data ecosystem. Examples of such contextual considerations include entity context (e.g., data is relevant to an ERP entity or any object, including objects outside of an ERP system), activity context (e.g., data is relevant to the current activity, such as preparing a sales campaign), user context (e.g., data is relevant to attributes associated with a selected user, which may or may not be the current user), other user context (e.g., data is relevant to members of the user's team or individuals in close organizational proximity to the user), subject matter expertise context (e.g., data is consistent with information related to a source considered to have expertise in a relevant subject matter), or process context (e.g., data is consistent with assumptions based on process awareness). Other contextual considerations could just as easily be established (e.g., monitored and worked into the data ecosystem) and leveraged appropriately.

At least with regard to activity context, there may be some information that is initially gathered from the user to support customization. For example, the user can open a template for a specific kind of activity or process or context, thereby feeding into the underlying system's ability to surface relevant information on a context-specific basis. In another example, a short wizard is encountered by the user when a document is opened, wherein the wizard facilitates interaction with the user in order to support a determination of an applicable activity or process or context (e.g., I want to create a new sales campaign). Those skilled in the art will appreciate that custom wizards and/or templates can be designed to concede many different kinds of data into the contextual analysis of what kinds of data or information might be of interest.

A similar pre-processing step can be carried out in order to assist the system in identifying a personal context affiliated with the person or persons from whose perspective data displays 1104-1120 are intended to be most relevant. For example, if the system is configured for a salesperson's context, then the kinds of data that may surface may be the kinds of data shown in data displays 1104-1120.

However, if the system is configured for a product liability attorney's context, then the kinds of data shown in data displays 1104-1120 is likely to be different (e.g., the types of data would be more legally focused). In one embodiment, the default user context is that associated with a logged in user, for example, the user logged into the corresponding operating system. In another embodiment, however, a given user can choose contexts associated with other users or user roles when they are, figuratively speaking, interested in seeing the same document through someone else's eyes.

In essence, document 1102 is a canvas and data displays 1104-1120 are like paint. This is true in that information within, or accessible through, displays 1104-1120 can be extracted (e.g., copied, cut, etc.) and pasted into document 1102. Such information can include, but it not limited to, textual snippets, graphics, audio data, whole files, partial files, video data, or any other type of data that might be useful to constructing a document 1102.

An example in the specific context of FIG. 11 will help to clarify some of the features of the illustrated user interface 1100. When the user of interface 1100 began the illustrated project, he or she illustratively provided some indication that they were a salesperson and that the project was to pertain to a new sales campaign for "Ipsum Golf Shoes." A contextual query was then made against the data ecosystem to determine whether there already existed data that would likely be relevant or of interest to the user. The query for relevant information accounted for a variety of different contexts possibly including, but certainly not limited to entity context, activity context, user context, other user context, subject matter expertise context, or process context.

The result of the query was a variety of relevant data illustratively from a variety of different data sources, potentially including sources both inside and outside of an ERP environment. The relevant data may have included, for example, related images (e.g., pdf slicks), add copy, vendor info, timeline info (time from warehouse to retail market), demographic information, etc. The most relevant of this information (e.g., the information most related to the user's role as a salesperson) is what ultimately ended up being displayed within displays 1104-1120. Things that were most important to the user's contextual considerations essentially bubbled to the surface. If the user wanted to, they could assumedly switch user profiles and view the same document from someone else's perspective, such as someone with a different role, but interface 1100 illustratively represents a particular salesperson's perspective.

It should be noted that the system can be configured such that process context has a strong impact on which data comes to the surface. For example, data most relevant to a brand new sales campaign may be of a different nature than data most relevant to a sales campaign that has been in force in the market place for more than two years. Users with different roles may have different processes. Once a master document has been created, different people can look at it from their own unique perspectives.

In another example of process context, the nature of data may change depending on a document's status in a process context. For example, what is most desirable to place within a document may vary depending on whether the document is a draft (e.g., an early software specification wherein brainstorming materials may still be interesting) or a final version (e.g., when the product is being built, desirable information may pertain more to troubleshooting or risk analysis). Some documents, such as project documents or spreadsheets, may be all about process ("process documents") and have a very focused and potentially relevant project relevance.

In general, the goal of user interface 1100 is to help people do effectively do the job they are trying to do when they want to do it. Also, the goal is to empower users to feel intelligent and relatively informed, as if they have all the information they need in order to make decisions right at their fingertips.

Figure 12:
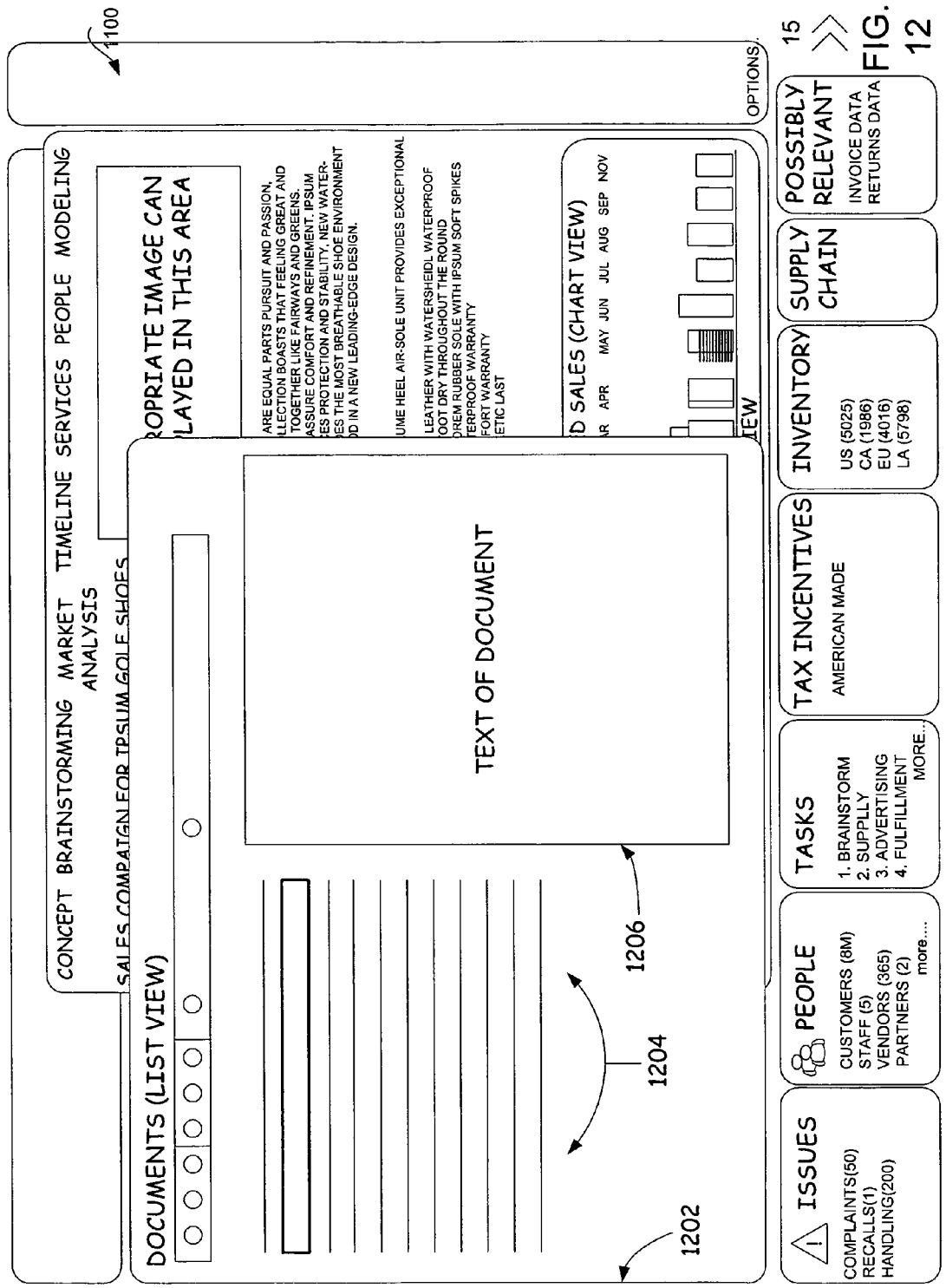
FIG. 12 is an illustration of the dynamic user interface including a particular sub-component.

Data display 1104 includes relevant documents. If the user selects one of the illustrated folders, then, as is illustrated in FIG. 12, a new display component 1202 illustratively appears (component 1202 is a wire frame representation of what an actual component may look like). As is indicated by arrow 1204, the left half of component 1202 includes a list containing document summaries (e.g., a summary of each document contained in a clicked-on file). The documents in the list are illustratively ranked based on their contextual relevancy (e.g., as determined through query utilized to obtain the data). A box 1206 contains all or part of a document selected from list 1204. In one embodiment, portions of the previewed document may be highlighted to indicate passages with specific association to one or more contexts reflected in the selection of data displays 1104-1120 (e.g., the associations may have, but not necessarily, been created through the entity highlighter tool described herein). Data contained in box 1206 can illustratively be extracted (e.g., copied or cut, etc.) and pasted into document 1102. Other of data displays 1104-1120 illustratively operate in a similar manner.

Regardless of how it is done, information is extracted from a source and added to document 1102, a document-to-document association can be added to the data ecosystem later to be potentially leveraged as an indication of relevance. In addition, a people-to-people association can be created to link the people associated with the source to the people association with the target. Finally a people-to-document association can be created to link the user extracting the information with the source document. This is just another example of how tagging can transparently be accomplished in order to add to the value of the data ecosystem in terms of its ability to determine relevance based on context.

Further, it should be noted that document displays 1104-1120 may change (e.g., disappear, get replaced, contents change, etc.) as contextual considerations change (e.g., new queries are made based on new contextual considerations). For example, a user can interact with the system in a manner that will have an impact on their total contextual profile. For example, if a user makes numerous document-to-document associations with sources all associated with the same author, the system illustratively accounts for this by strengthening a calculated assumption that other documents by the same author may also be of interest. Other data sources used by that author when the documents were created may also be relevant. This type of data may, as it becomes more likely to be relevant, replace the data that originally appeared higher in terms of relevancy.

Thus, when a user adds something to a document from an existing source, corresponding information is recorded and accounted for in terms of the algorithms for determining what data should be brought to the surface of user interface 1100 (e.g., what data is most likely to be of relevance in the current context). On top of this particularly efficient and effective tagging scheme, the user interface makes it relatively easy to locate and incorporate quality relevant data.

Figure 13:
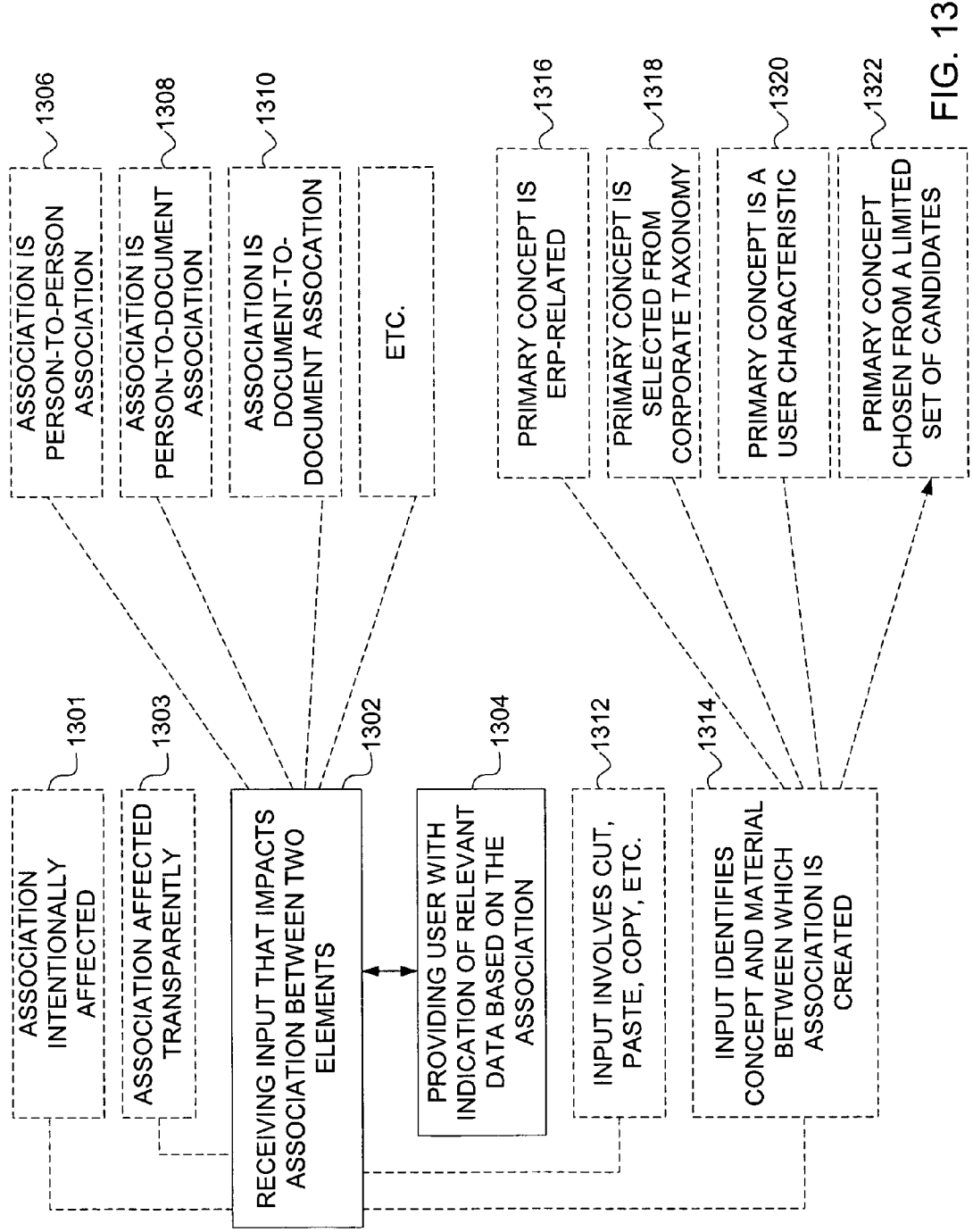
FIG. 13 is a block flow diagram demonstrating examples of various ways in which tagging can be implemented.

FIG. 13 is a block flow diagram demonstrating examples of various ways in which a tagging scheme can be implemented. In accordance with blocks 1301 and 1303, tagging can be accomplished by a user either intentionally or transparently. In accordance with block 1302, an input is received. The input affects an association that links at least two elements within a data system. In accordance with block 1304, an indication of relevant data is provided based at least in part on the affected association. Blocks 1306, 1308 and 1310 demonstrate that the association could be person-to-person, person-to-document, document-to-document, etc. In accordance with block 1312, affecting an association occurs when the input includes a paste commend in combination with a copy or cut command.

In accordance with block 1314, the input identifies a primary concept and related material, for example, material selected from a document. An association is created based between the concept and the material. In accordance with block 1316, the primary concept is ERP-related, such as an ERP entity. In accordance with block 1318, the primary concept is selected from a corporate taxonomy. In accordance with block 1320, the primary concept is a user characteristic. In accordance with block 1322, the primary concept is chosen from a limited set of candidates.

A scenario can be imagined wherein a user extracts information from four documents and pastes it into the currently active document. Suppose that all four documents were authored by a person herein referred to as Karen. The system is illustratively configured to pick up on the fact that Karen may be an expert in an area important to the user. The system illustratively is then configured to bring Karen's expertise to the surface without having to actually bug Karen herself. The working assumption is that the things relevant to Karen are likely to be the same things relevant to the user, or at least to the user's current document.

In essence, data comes to the user instead of the user having to go and hunt for it. This being the case, the user avoids the arduous process of querying based on their own semantics and sorting through long lists of results. The user's own "human filter" is avoided.

The described user interface concepts can be particularly advantageous when a document is being constructed through collaboration or group interaction. The system is illustratively configured to enable toggling between contextual perceptions of a document (e.g., the data displays will vary depending on a selected perception or context). In one embodiment, a group can collectively maintain one "presentation view" (e.g., with a particular set of associated data displays) while each collaborator can toggle back and forth to their own personalized view (e.g., with their own set of data displays). Assuming access to do so, collaborators can view the document from the perception of someone else's context or role. In one embodiment, a user can place a holder on a particular document view so that view will be what is presented to the next user. A user can illustratively place personalized task lists, open issues, etc. on their view, which, if they desire, will show up when others see things from their view. A vendor looking at a salesperson's campaign will have different contextual interests, thus, different data displays are likely to surface.

Thus, it should now be clear that the underlying system is configured to, based on a variety of different contexts, speculate on the relevancy of data from a variety of different sources. Those skilled in the art will appreciate that there are many different ways to actually value and weight such a determination of relevancy. In fact, the proposed system and the breadth of the data ecosystem enable such a determination to be made on a very dynamic and diverse basis considering factors such as 1) what is relevant; 2) when is it relevant; 3) what makes it relevant; and 4) how is relevant data organized. All of these and other factors can be weighted into the ultimate determination of what should rise to the top as being the data most likely to be interesting to the applicable user.

Context can certainly be utilized to influence ranking both while tagging and when retrieving results. For example, a rule may establish that when creating a sales campaign, historical or theoretical campaigns should always be shown if they are available. For example, an entry point for tagging a product sku is provided from a customer service form.

Role can certainly be utilized to influence ranking both while tagging and when retrieving results. For example, a user may be less interested in evaluations from the information technology department than evaluations of a golf shoe. For example, a user may be more interested in sales staff evaluations of similar shoe in a relevant product line.

Frequency can certainly be utilized to influence ranking. For example, if something is being accessed time and again, then it is more likely to be relevant than if it is hardly ever accessed. Security could play a role (e.g., is the source a trusted source or one that is worthy of skepticism).

Expertise can certainly influence ranking. For example, Jimmy works in the mailroom. That being said, Jimmy happens to be an authority on Ipsum Golf shoes and waterproofing woes. Jimmy is a member of the FWGC (Foul Weather Golf Club) and has posted lots of feedback on what kind of weather does these shoes in and where they excel. He's even provided detailed instructions to the design department on which seams are likely to leak. Information linked to Jimmy should potentially be weighted more heavily, especially if the search context includes an Ipsum Golf shoes sales campaign.

In accordance with one embodiment, when a user is curious as to why a particular item of data is surfacing, they can select an option that reveals the related tagging, associations, assumptions from the data ecosystem, etc. In one embodiment, a user is allowed to untie a tag, association, assumption, etc.

Figure 14:
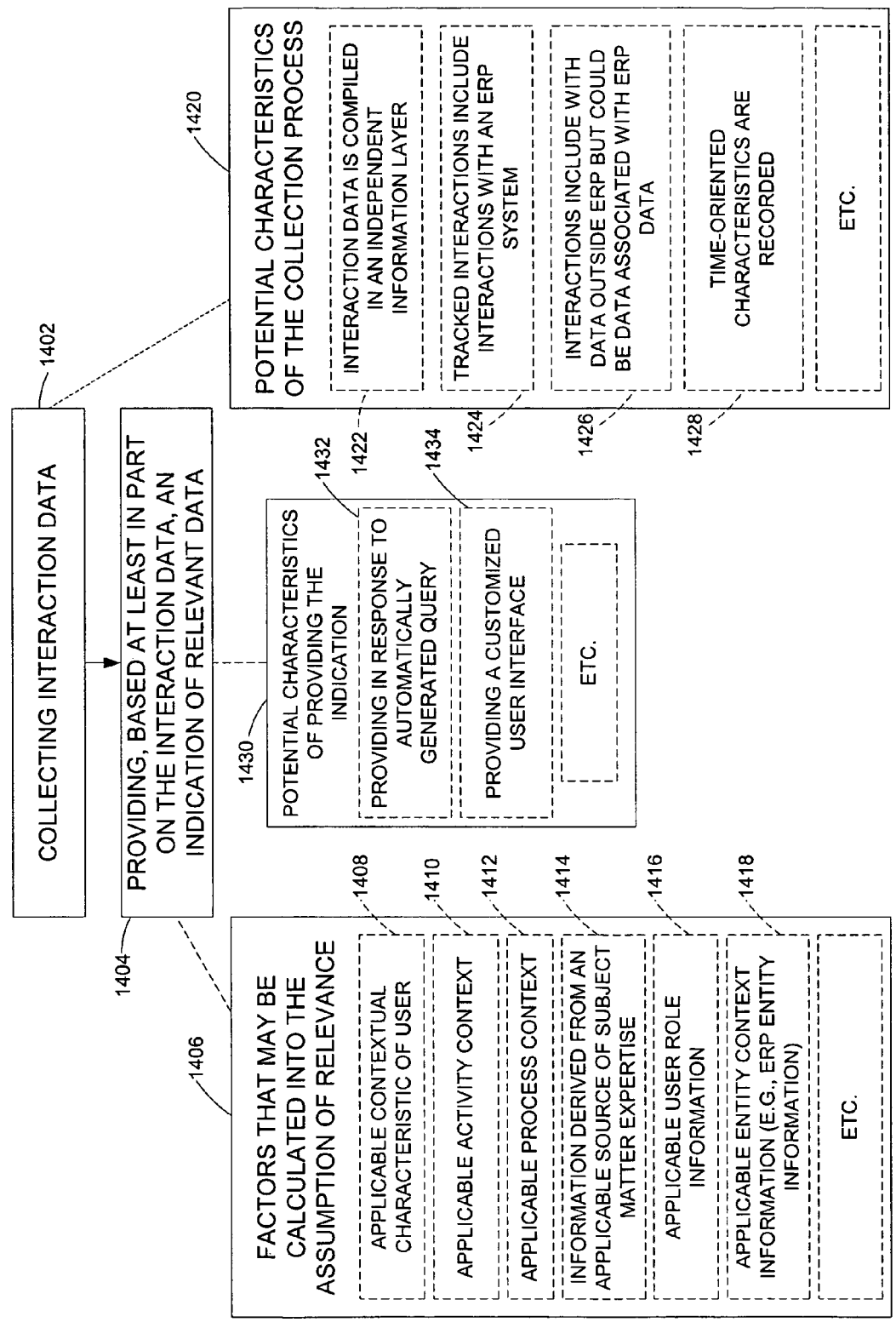
FIG. 14 is a block flow diagram demonstrating examples of different ways in which an indication of relevant data can be generated in accordance with the described system architecture.

FIG. 14 is a block flow diagram demonstrating examples of different ways in which an indication of relevant data can be generated in accordance with the described system architecture. In accordance with block 1402, interaction data is collected. The interaction data illustratively includes data that pertains to human interaction with multiple data systems. At least one of the human interactions is illustratively effectuated outside of an Internet environment. In accordance with block 1404, a user is provided with, based at least in part on the collected information, an indication of relevant data.

Block 1406 contains factors that may be calculated into the assumption of relevance. The factors include an applicable contextual characteristic 1408 of a user, an applicable activity context 1410, an applicable process context 1412, information 1414 derived from an applicable source of subject matter expertise, applicable user role information 1416, applicable entity context information 1418, etc. These are several examples of the many potential configurations described herein.

Block 1420 contains potential characteristics of the process of collecting interaction data. Block 1422 indicates that the interaction data is compiled in an independent information layer (e.g., information is tracked within a metadata system that is generally independent from the data systems with which the interactions occur). Block 1424 indicates that tracked interactions include information pertaining to interactions with an ERP system. Block 1426 indicates that tracked interactions include some with data that exists outside of an ERP system (but the data may be associated with data inside of an ERP system). Block 1428 indicates that tracked interaction data may include related time-oriented characteristics. These are several examples of the many potential configurations described herein.

Block 1430 contains some potential characteristics of the process of providing an indication of relevant data. As is indicated by block 1432, providing may comprise providing in response to an automatically generated query. As is indicated by block 1434, the indication may be provided through a customized user interface. These are several examples of the many potential configurations described herein.

The proposed system is advantageous at least because it takes an expansive information system into account, meaning that it extends across multiple data sources. Further, the system is configured to identify subject matter experts and leverage their expertise without directly bothering the experts. Further, the system leverages time in order further refine data retrieval and enable more relevant results. The system supports context specific user interface models. The overall system is user-focused and is centered around the user as an important point of reference.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for providing a first user with a link to a word processing document, the relevancy of the word processing document from the perspective of the first user being determined at least in part on data interactions initiated by a second user, the first user being different than the second user, wherein the method comprises:

storing, on a computer readable storage medium, a record of a role assumed by the second user within an organization;

receiving, from the second user, a cut command that is a cut portion of a cut-and-paste operation, the cut command causing a removal of a collection of text from a word processing document;

responding to the received cut command by modifying information in a database to indicate a creation or alteration of an association between the second user and the word processing document;

storing a data record that includes an identifier indicating a template as being associated with a particular activity;

receiving from the first user a command to open the template;

preferentially identifying and selecting the word processing document based on a programmed assumption that the first user will be interested in the word processing document because those engaged in the activity are likely to be interested in a document from which a person assigned the role within the organization cut material, wherein identifying comprises referencing the record of the role, the information in the database that indicates creation or alteration of the association, and the data record that includes the identifier indicating the template;

utilizing the computer processor to preferentially provide, based on the programmed assumption and in response to the received command to open the template, the first user with the link to the word processing document by visibly rendering the link as part of a graphical user interface displayed to the first user on a display.

2. The method of claim 1, further comprising storing a data record that includes a listing of a plurality of individual tasks that are part of a process;

identifying a point where the first user is in the process by identifying, from a record of inputs received from the first user, which of the plurality of individual tasks has been completed, wherein identifying comprises referencing the data record that includes a listing of a plurality of individual tasks that are part of a process; and wherein the programmed assumption upon which the word processing document is preferentially identified is also based on an assumption that the first user will be interested in the word processing document because those at the identified point in the process that are engaged in the activity are likely to be interested in a document from which a person assigned the role within the organization cut material.

3. The method of claim 1, further comprising:
storing a data record that identifies the second user as a source of a particular type of subject matter expertise;
wherein identifying and selecting comprises referencing the data record that identifies the second user as a source of the particular type of subject matter expertise;
wherein the programmed assumption upon which the word processing document is preferentially identified is also based on an assumption that the first user will be interested in the word processing document because those at the identified point in the process that are engaged in the activity are likely to be interested in a document associated with a person that is a source of the particular type of subject matter expertise.

4. The method of claim 1, wherein providing the first user with the link further comprises providing in response to an automatically generated query.

5. The method of claim 1, wherein providing the first user with the link further comprises providing the link on the graphical user interface as part of a collection of links, each link in the collection being to a different word processing document that is consistent with the programmed assumption.

6. The method of claim 2, further comprising:
storing a data record that identifies the second user as a source of a particular type of subject matter expertise;
wherein identifying and selecting comprises referencing the data record that identifies the second user as a source of the particular type of subject matter expertise;
wherein the programmed assumption upon which the word processing document is preferentially identified is also based on an assumption that the first user will be interested in the word processing document because those at the identified point in the process that are engaged in the activity are likely to be interested in a document associated with a person that is a source of the particular type of subject matter expertise.

7. The method of claim 6, wherein providing the first user with the link further comprises providing the link on the graphical user interface as part of a collection of links, each link in the collection being to a different word processing document that is consistent with the programmed assumption.

8. A computer-implemented method for providing a first user with a link to a word processing document, the relevancy of the word processing document from the perspective of the first user being determined at least in part on data interactions initiated by a second user, the first user being different than the second user, wherein the method comprises:
receiving, from the second user, a copy command that is a copy portion of a copy-and-paste operation, the copy command causing a capture of a collection of text from a word processing document;
responding to the received copy command by modifying information in a database to indicate a creation or alteration of an association between the second user and the word processing document;
utilizing a computer processor that is a component of the computer to preferentially identify and select the word processing document based on a programmed assumption that the first user will be interested in the word processing document because the first user is likely to be interested in documents from which the second user has copied text, wherein identifying comprises referencing the information in the database that indicates creation or alteration of the association; and
utilizing the computer processor to preferentially provide, based on the programmed assumption and in response to the received command to open the template, the first user with the link to the word processing document by visibly rendering the link as part of a graphical user interface displayed to the first user on a display.

9. The method of claim 8, further comprising
storing a data record that includes a listing of a plurality of individual tasks that are part of a process;
identifying a point where the first user is in the process by identifying, from a record of inputs received from the first user, which of the plurality of individual tasks has been completed, wherein identifying comprises referencing the data record that includes a listing of a plurality of individual tasks that are part of a process; and
wherein the programmed assumption upon which the word processing document is identified also assumes that the first user will be interested in the word processing document because those at the identified point in the process are likely to be interested in a document in which the second user has demonstrated in interest by copying text.

10. The method of claim 8, further comprising:
automatically determining, based on a record of data manipulations initiated by the second user, that the second user is a source of a certain type of subject matter expertise;
storing a data record that identifies the second user as a source of the certain type of subject matter expertise;
wherein preferentially identifying and selecting further comprises referencing the data record that identifies the second user as a source of the certain type of subject matter expertise; and
wherein the programmed assumption upon which the word processing document is preferentially identified is also based on an assumption that the first user will be interested in the word processing document because the first user is likely to be interested in documents associated with a person that is a source of the particular type of subject matter expertise.

11. The method of claim 8, wherein providing the first user with the link further comprises providing in response to an automatically generated query.

12. The method of claim 8, wherein providing the first user with the link further comprises providing the link on the graphical user interface as part of a collection of links, each link in the collection being to a different word processing document that is consistent with the programmed assumption.

13. The method of claim 9, further comprising:
storing a data record that identifies the second user as a source of a particular type of subject matter expertise;
wherein preferentially identifying and selecting further comprises referencing the data record that identifies the second user as a source of the particular type of subject matter expertise;
wherein the programmed assumption upon which the word processing document is preferentially identified is also based on an assumption that the first user will be interested in the word processing document because those at the identified point in the process are likely to be interested in a document associated with a person that is a source of the particular type of subject matter expertise.

14. The method of claim 13, wherein providing the first user with the link further comprises providing the link on the graphical user interface as part of a collection of links, each link in the collection being to a different word processing document that is consistent with the programmed assumption.

15. A computer-implemented method for providing a first user with a link to a word processing document, the relevancy of the word processing document from the perspective of the first user being determined at least in part on data interactions initiated by a second user, the first user being different than the second user, wherein the method comprises:

receiving, from the second user, a cut command that is a cut portion of a cut-and-paste operation, the cut command causing a capture of a collection of text from a source word processing document;

receiving, from the second user, a paste command that is a paste portion of the cut-and-paste operation, the paste command causing an insertion of the collection of text into a destination word processing document;

responding to the received cut command by modifying information in a database to indicate a creation or alteration of a first association between the second user and the source document;

responding to the received paste command by modifying information in the database to indicate a creation or alteration of a second association between the source and destination word processing documents;

utilizing a computer processor that is a component of the computer to preferentially identify and select the destination word processing document based on a programmed assumption that the user is likely to be interested in the source document because it is associated with the second user, and that the user is likely to be interested in the destination document because it is associated with the source document, wherein identifying comprises referencing the information in the database that indicates creation or alteration of the first and second associations; and utilizing the computer processor to preferentially provide, based on the programmed assumption, the first user with the link to the word processing document by visibly rendering the link as part of a graphical user interface displayed to the first user on a display.

16. The method of claim 15, further comprising
storing a data record that includes a listing of a plurality of individual tasks that are part of a process;
identifying a point where the first user is in the process by identifying, from a record of inputs received from the first user, which of the plurality of individual tasks has been completed, wherein identifying comprises referencing the data record that includes a listing of a plurality of individual tasks that are part of a process; and
wherein the programmed assumption upon which the destination word processing document is identified also assumes that the first user will be interested in the source word processing document because those at the identified point in the process are likely to be interested in a document in which the second user has demonstrated in interest by cutting text.

17. The method of claim 8, further comprising:
automatically determining, based on a record of data manipulations initiated by the second user, that the second user is a source of a certain type of subject matter expertise;
storing a data record that identifies the second user as a source of the certain type of subject matter expertise;
wherein preferentially identifying and selecting further comprises referencing the data record that identifies the second user as a source of the certain type of subject matter expertise; and
wherein the programmed assumption upon which the destination word processing document is preferentially identified is also based on an assumption that the first user will be interested in the source word processing document because the first user is likely to be interested in documents associated with a person that is a source of the particular type of subject matter expertise.

18. The method of claim 15, wherein providing the first user with the link further comprises providing in response to an automatically generated query.

19. The method of claim 15, wherein providing the first user with the link further comprises providing the link on the graphical user interface as part of a collection of links, each link in the collection being to a different word processing document that is consistent with the programmed assumption.

20. The method of claim 16, further comprising:
storing a data record that identifies the second user as a source of a particular type of subject matter expertise;
wherein preferentially identifying and selecting further comprises referencing the data record that identifies the second user as a source of the particular type of subject matter expertise;
wherein the programmed assumption upon which the destination word processing document is preferentially identified is also based on an assumption that the first user will be interested in the source word processing document because those at the identified point in the process are likely to be interested in a document associated with a person that is a source of the particular type of subject matter expertise.

21. The method of claim 15, wherein providing the first user with the link further comprises providing the link on the graphical user interface as part of a collection of links, each link in the collection being to a different word processing document that is consistent with the programmed assumption.

* * * * *